United States Patent
Koren et al.

(10) Patent No.: US 9,874,649 B2
(45) Date of Patent: *Jan. 23, 2018

(54) DEVICE AND METHOD FOR DISPLAYING FULL AZIMUTH ANGLE DOMAIN IMAGE DATA

(71) Applicant: Paradigm Sciences LTD., Grand Cayman (KY)

(72) Inventors: Zvi Koren, Ra'anana (IL); Igor Ravve, Houston, TX (US); Evgeny Ragoza, Katy, TX (US)

(73) Assignee: Paradigm Sciences Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,485

(22) Filed: May 19, 2017

(65) Prior Publication Data
US 2017/0254912 A1    Sep. 7, 2017

Related U.S. Application Data

(63) Continuation of application No. 15/262,124, filed on Sep. 12, 2016, now Pat. No. 9,658,355, which is a continuation of application No. 14/260,778, filed on Apr. 24, 2014, now Pat. No. 9,449,422, which is a continuation of application No. 14/046,327, filed on Oct. 4, 2013, now Pat. No. 8,744,134, which is a
(Continued)

(51) Int. Cl.
| | |
|---|---|
| *G06K 9/00* | (2006.01) |
| *G01V 1/34* | (2006.01) |
| *G06T 15/04* | (2011.01) |

(52) U.S. Cl.
CPC ............... *G01V 1/345* (2013.01); *G01V 1/34* (2013.01); *G06K 9/00476* (2013.01); *G06T 15/04* (2013.01); *G01V 2210/64* (2013.01); *G01V 2210/74* (2013.01)

(58) Field of Classification Search
CPC .......................... G06T 15/04; G01V 2210/74; G01V 2210/64; G01V 1/345; G01V 1/34; G06K 9/00476
See application file for complete search history.

(56) References Cited

U.S. PATENT DOCUMENTS

| | | | |
|---|---|---|---|
| 7,184,991 B1 * | 2/2007 | Wentland ............... | G01V 11/00 706/14 |
| 8,022,947 B2 * | 9/2011 | Wei .......................... | G01V 1/34 345/419 |

(Continued)

*Primary Examiner* — Shefali Goradia
(74) *Attorney, Agent, or Firm* — Pearl Cohen Zedek Latzer Baratz LLP

(57) ABSTRACT

A device, system, and method for displaying seismic image data may include computing, from a wide-azimuth data set, a discrete data set associated with an image function at a seismic image point. The discrete data set may be mapped onto a continuous curved three-dimensional surface. The mapped data set may be projected onto a continuous planar surface. The projected data may be displayed as a planar disk. A plurality of continuous planar surfaces, each representing a single image point, may be assembled to form a three-dimensional body, representing a seismic gather of image points. The three-dimensional body may be displayed. Other embodiments are described and claimed.

20 Claims, 8 Drawing Sheets

Related U.S. Application Data continuation of application No. 12/663,326, filed as application No. PCT/US2008/066041 on Jun. 6, 2008, now Pat. No. 8,582,825.

(60) Provisional application No. 60/924,972, filed on Jun. 7, 2007.

(56) References Cited

U.S. PATENT DOCUMENTS

| | | | | |
|---|---|---|---|---|
| 8,120,991 B2* | 2/2012 | Koren | ...................... | G01V 1/32 345/428 |
| 2005/0203375 A1* | 9/2005 | Willis | .................. | A61B 5/0422 600/407 |

* cited by examiner

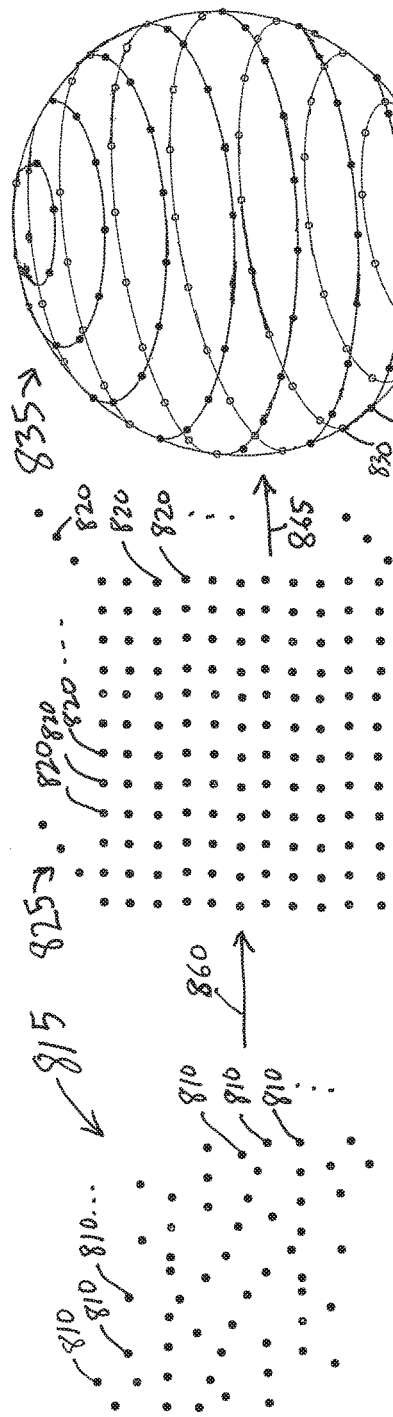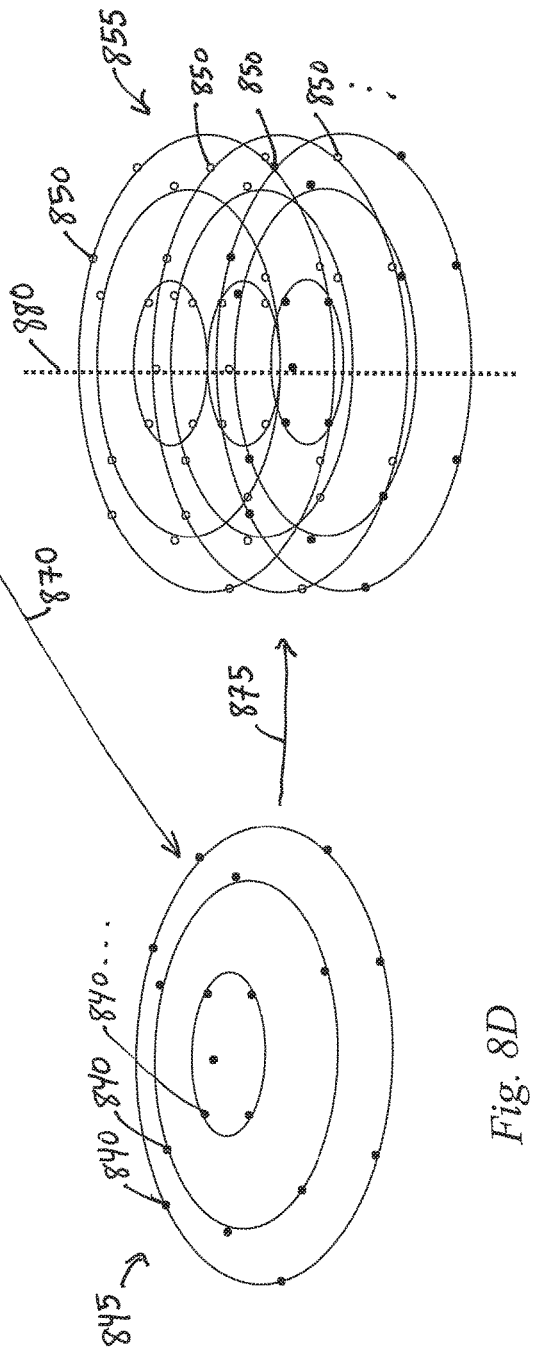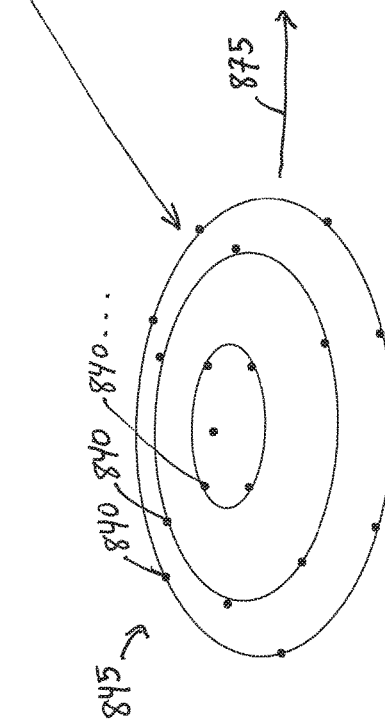

DEVICE AND METHOD FOR DISPLAYING FULL AZIMUTH ANGLE DOMAIN IMAGE DATA

RELATED APPLICATION DATA

This application is a continuation application of U.S. patent application Ser. No. 15/262,124, filed on Sep. 12, 2016, which is a continuation application of U.S. patent application Ser. No. 14/260,778, filed on Apr. 24, 2014, which is a continuation application of U.S. patent application Ser. No. 14/046,327, filed on Oct. 4, 2013, which is a continuation application of U.S. patent application Ser. No. 12/663,326, filed on Dec. 7, 2009, which is a national phase application of International Application No. PCT/US2008/066041, filed on Jun. 6, 2008, which in turn claims the benefit of prior U.S. provisional application No. 60/924,972, filed on Jun. 7, 2007, all of which are incorporated herein by reference in their entirety.

FIELD OF THE INVENTION

The present invention relates to the representation and display of image data, such as multi-dimensional angle domain seismic data or other angle-related three dimensional data.

BACKGROUND OF THE INVENTION

A transmitter located on the earth's surface or elsewhere may transmit signals, such as acoustic waves, compression waves or other energy rays or waves that may travel through subsurface structures. The transmitted signals may become incident signals that are incident to subsurface structures. The incident signals may reflect at various transition zones or geological discontinuities throughout the subsurface structures. The reflected signals may include seismic events. Seismic events including, for example, primary (P) waves and shear (S) waves (e.g., transverse waves in which particle motion may be perpendicular to the direction of propagation of the wave) may be used to image subsurface geological structures, for example, transition surfaces or geological discontinuities. A receiver may collect and record data, for example, reflected seismic events.

Surveys may use large numbers of transmitters and receivers to record signals across large geophysical regions. Seismic surveyed regions may, for example, extend to several hundred square kilometers. In some surveys, the distance between transmitters and receivers may be, for example, about twenty meters, transmitted signals may travel up to about ten kilometers, and frequencies of transmitted signals may be about fifty Hertz. Other values or parameters may be used. Recorded data may be collected over intervals of time, for example, ten second intervals, and may be digitized every 4 milliseconds, although other parameters are also possible. For example, the receiver may collect and/or record several tens or hundreds of terabytes of data. Once collected, the recorded data may be stored and/or transmitted to a storage or data processing device such as a memory, server or computing system.

Some seismic acquisition methods, such as multi-azimuth or wide-azimuth data acquisition methods, may significantly increase the number of transmitted and received signals used in order to enhance the illumination of reservoirs below complex structures and increase the precision of geophysical detection. For such methods, single parameters (e.g., pressure or vertical displacement) or multiple parameters (e.g., pressure and three displacement components) may be recorded. Both P waves and S waves may be recorded. Other types of waves and other data may be recorded. Such methods may increase the amount of data recorded for imaging subsurface regions. To accommodate the increased amount of data, systems that record, process, image, or otherwise use the data may require increased storage size, increased speed for access to input and/or output devices, and/or high performance computation (HPC) hardware or the like. Such systems may provide computationally and/or power intensive services.

Exploration of geophysical regions may include imaging the subsurface earth, using seismic data recorded from surveying regions, in order to locate for example hydrocarbon reservoirs. Seismic imaging methods, which may be referred to as seismic migrations, may be classified for example into two main categories: wave equation migrations and ray-based Kirchhoff migrations. Both types of migrations may be used to generate images of the subsurface of the earth. Wave equation migration mechanisms may use numerical solutions to the wave equation to extrapolate the recorded wavefields into the subsurface of the earth. At each level of depth, imaging conditions may be applied to the incident and reflected wavefields. Ray-based Kirchhoff migrations may be performed in two stages: ray tracing and imaging. Ray tracing may model the propagation of waves (e.g., rays), for example, in a direction from a surface towards an image point in a subsurface region, and/or in a direction from an image point in a subsurface region towards a surface. Ray attributes, such as traveltimes, ray trajectories, slowness vectors, amplitude and phase factors, may be computed along the traced rays. In the imaging stage, the ray attributes may be used to obtain an image of the earth's subsurface from the recorded seismic data.

Both wave equation and ray-based Kirchhoff migrations may generate common image gathers (CIGs). CIGs may include multiple image traces at a given lateral location. Each image trace may be generated using a portion of the recorded data that has a common geometrical attribute. For example, an offset domain common image gather (ODCIG) may include multiple image traces, where each trace may be constructed using seismic data points with the same offset or distance between a source and receiver on the earth's surface. An angle domain common image gather (ADCIG) may include multiple image traces, where each trace may be constructed using seismic data points with the same opening angle between the incident and reflected rays at the reflection point.

CIGs generated using traces that share a single azimuth may image geophysical structures with insufficient accuracy. For example, anisotropy effects show that images obtained from different azimuth angles may be significantly different. Imaging geophysical structures, such as faults, small vertical displacements, and sub-seismic scale fractures (e.g., fractures measuring less than tens of meters, which may be below the resolution for detection of typical receivers or other detection instruments), with desired accuracy, may require imaging along substantially each azimuth angle (which may be referred to for example as full-azimuth imaging). Wide-azimuth seismic data may be especially valuable for imaging, for example, below salt dome or salt laden structures, such as those in the Gulf of Mexico. Imaging geophysical structures using, for example, three-dimensional (multi-azimuth) CIGs, instead of commonly used two-dimensional (e.g., single or narrow azimuth) CIGs, may improve image accuracy and provide additional information about the structures. For example, three-dimensional ODCIGs may include multiple image traces that have substantially different azimuth angles on the earth's surface, in addition to substantially different source-receiver offsets. The offset may be a two-dimensional vector, for example, having values for in-line and cross-line components, or a length and an azimuth. Similarly, three-dimensional ADCIGs may include multiple image traces that have substantially different opening azimuth angles at the reflecting surface, in addition to substantially different opening angles. The opening angle may be, e.g., an angle between the incident and reflected rays, measured at the reflection point corresponding thereto. The opening azimuth angle may be, e.g., the azimuth of the normal to a plane that passes through the incident and the reflected rays. Other angles may alternatively be used. Although three-dimensional CIGs may increase imaging accuracy, they may also increase the computational complexity of imaging, visualization, and/or interpretation systems using such gathers. Operation of three-dimensional CIGs may also require extensive memory and storage capacity.

CIGs may be used, for example, in the kinematic and dynamic analysis of subsurface structures. For example, kinematic analysis may be used to build and update geophysical models using tomography mechanisms. Tomography mechanisms may be used to find a set of model parameters that substantially minimize travel time errors along specular rays (e.g., ray-pairs that obey principles of Snell's law at the reflecting surfaces). The travel time errors may for example be measured from the differences between locations of the reflection events along the CIGs. Substantially each reflection event within a given CIG may be related to a specific depth. If a "true" reflector (e.g., a reflection surface element) is located at a definite depth and the model parameters are "correct", then the reflector elements are typically at the same depth irrespectively of the reflection angle or the offset indicated by the specific trace. When reflection events are not located at substantially the same depth (e.g., when reflection events along the CIGs are not substantially flat), the measured or picked differences between the reflection depths of different reflection events may be used to estimate the travel time errors along the specular rays associated with each trace. A model may be substantially correct when the seismic reflection events along the CIGs are substantially horizontally flat. In order to obtain an accurate model, for example, using an anisotropy model representation, specular rays and the corresponding travel time errors from varying opening angles (or e.g., offsets) for example, from substantially all azimuths may be used. In some embodiments, such three-dimensional CIGs may provide information about the azimuthal dependent travel time errors.

Dynamic analysis may include determining physical and/or material parameters or properties of target subsurface structures using changes in the amplitude and phase of reflected signals measured, for example, along the CIGs. Multi-azimuth CIGs may make it possible to perform azimuthal analysis of amplitude variations with respect to the opening angle (or e.g., offset), which may result in an accurate reconstruction of anisotropy parameters and small scale fractures.

Imaging other than seismic or subsurface imaging for the exploration and production of oil and gas, such as for example, shallow seismic imaging for environmental studies, archeology and construction engineering, may be performed. These other methods may similarly generate large amounts of data and have large computational needs. Other types of imaging, such as medical imaging, may also use a relatively large number of transmitters and detectors and therefore may also use a relatively large amount of data, which may require large storage and intensive computational efforts.

The prior patent application Ser. No. 11/798,996, describes efficient use, storage, processing, imaging, analysis, visualization and interpretation of the rich azimuth data in reduced dimensional coordinate system. In some other imaging applications, the rich azimuth data are decomposed into few (e.g., up to eight) azimuthal sectors. A need exists for displaying the discrete data, stored for example in reduced dimensional coordinate system, or the azimuthally sectorized data, in a continuous full dimensional coordinate system.

SUMMARY

Embodiments of the invention may include computing, from a wide-azimuth data set, a discrete data set associated with an image function at a seismic image point. The discrete data set may be mapped onto a continuous curved three-dimensional surface. The mapped data set may be projected onto a planar surface. A plurality of continuous planar surfaces, each representing a single image point, may be assembled to form a three-dimensional body, representing a seismic gather of image points. The three-dimensional body may be displayed. Other embodiments are described and claimed.

BRIEF DESCRIPTION OF THE DRAWINGS

The principles and operation of the system, apparatus, and method according to embodiments of the present invention may be better understood with reference to the drawings and the following description, it being understood that these drawings are given for illustrative purposes only and are not meant to be limiting.

FIGS. 8A, 8B, 8C, 8D, and 8E, are schematic illustrations of an image function defined on nodes arranged in various configurations, and maps therebetween, according to an embodiment of the invention.

Figure 1:
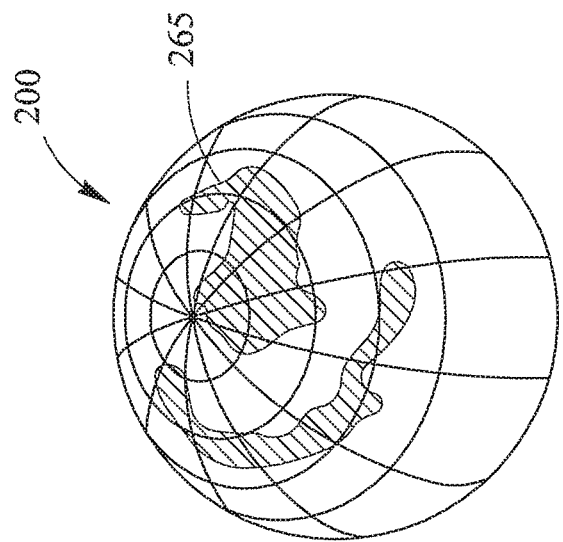
FIG. 1 is a schematic illustration of a spherical display of reflection angle data associated with a single image point, according to an embodiment of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

Introduction

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention. Unless specifically stated otherwise, as apparent from the following discussions, it is appreciated that throughout the specification discussions, utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other, such as information storage, transmission or display devices. The term "display" may be used herein to describe a visual representation and/or a device for depicting such a representation and/or a method or an algorithm for such representation. In addition, the term "plurality" may be used throughout the specification to describe two or more components, devices, elements, parameters and the like.

Seismic data may include or represent seismic events (or e.g., signals) that reflect and/or diffract at discontinuous objects and/or continuous horizons. Continuous horizons may include, for example, interfaces between geological layers. Discontinuous objects may include, for example, small scale diffractors, faults, or small scale fractures.

Seismic data collected and/or calculated for seismic imaging may be complicated and rich with information. For example, seismic data may include multiple components, e.g., traveltimes, offsets, zenith angles, azimuth angles, reflection angles, directions, etc. Each image point may be computed or defined using multiple components. Each image point may have a value for each of the multiple components. However, it may be impractical to display all of the component values for all of these components at once to a user. For example, if each component is represented in a distinct dimension of a three dimensional (3D) display, at most three of these components may be displayed at once to a user, or the multiple component values may be used to create the three components of the 3D display, and thus the actual source component values may not be displayed. A standard display may be any a visual representation of the spatial properties of the physical universe. In one embodiment, a standard 3D display may represent a geophysical space using, for example, three components per data point, such as, two Cartesian components of the data point location and a function value at each point. In this embodiment, the image function $f$ may be presented as a curved 3D surface in the Cartesian space, $f=f(x, z)$, where x may be the lateral coordinate and z may be depth. In another embodiment, all three of the components for each data point of a 3D standard display may be used to specify a spatial location of the data point. Each function value $f(x, y, z)$, where x and y may be two lateral coordinates and z may be depth, at each point may alternatively be represented by one of a plurality of colors or intensities. In each of these embodiments, a standard display typically shows only a subset of the multiple components to provide a general or simplified overview of a geophysical area being studied.

A user may want to view additional or other components or information not typically shown in a standard display. For example, a user may want to view reflection angles and/or directional data at each point, or at a selected point or set of points. A pair of reflection angle and directional displays for a point, where the directional display has a single or narrow range of polar angles and the reflection display has multiple or a wide range of polar angles, may indicate that the image point lies on a fault line. Thus, it may be desirable to concurrently view reflection angle and directional data corresponding to an image point. These methods may be used for geophysical exploration using reflection angle gathers and directional gathers. Other features may be determined by values of certain components.

Embodiments of the present invention provide a mechanism for displaying information different from that displayed with the standard display using various types of displays. For example, a "spherical" display (e.g., FIGS. 1 and 2) and a "cylindrical" display (e.g., FIGS. 3 and 4) may be used. Shapes other than spherical and cylindrical displays may be used. One embodiment of the spherical display may display the additional data for a single point while one embodiment of the cylindrical display may display the additional data for a plurality of points.

A display may represent a function, $f$. The function may be defined for one or more arguments, e.g., zenith and azimuth. The function may have a value for the arguments, e.g., typically defined as $f(\theta,\varphi)$, where $\theta$ may be the zenith angle and $\varphi$ may be the azimuth angle. For example, a spherical display may represent a function (e.g., vs. a reflection angle in FIG. 1; and vs. a direction in FIG. 2) value corresponding to each coordinate (e.g., different arguments, zenith and azimuth) of the sphere. The whole spherical display may correspond to a single point on a standard display. Thus, a spherical display may represent the function (e.g., vs. a reflection angle in FIG. 1; and vs. a direction in FIG. 2) value for all polar angle values associated with a single point of the standard display. The function value at all polar angles may be important information when using wide or full azimuth seismic data (e.g., data collected by imaging at many azimuth angles). The spherical display may represent other image functions, such as, reflectivity, seismic amplitude, or traveltimes. The type of additional data displayed on the sphere may be predetermined, programmed, and/or selected or modified by a user.

The cylindrical display typically represents a plurality (e.g., a line that may be vertical, tilted, curved, etc.) of points (e.g., a gather) of the standard display. The axial cross-section of the cylindrical display may represent a meridian gather, which may be a data set representing a plurality of image points having different depths or zenith angles, and the same azimuth angle.

In one embodiment, a plurality of spherical displays, each representing a single point of the standard display, may be combined to concurrently display a plurality (e.g., a line that may be vertical, tilted, curved, etc.) of such points. In one embodiment, each of the plurality of spherical displays may be flattened or projected onto a two-dimensional (2D) planar surface forming a planar (e.g., circular) disk. In one embodiment, the planar disks bounded by 2D curved lines may be stacked or otherwise assembled or combined to form a cylinder (e.g., regular, tilted, with a curved axis, etc.) representing the plurality (e.g., a vertical line, a tilted line, a curve, etc.) of points of a standard model or representation of the geometry of the physical universe. For example, the plurality of points shown in a standard model may correspond to an image gather or other object.

According to this construction, each point of a standard model may correspond to a separate spherical display. Each spherical display may in turn correspond to a planar disk or other planar figure (e.g., the flattened sphere). Each planar disk may in turn correspond to a point on the axis of a cylinder (e.g., as a normal cross-section of the cylinder at the point), constructed by stacking the planar disks.

A user may manipulate the view of the spherical or cylindrical displays. For example, a user may move a cursor or mouse or other pointing or input device to select or search along a length (e.g., an axis of symmetry) of the cylinder display. For example, when the user selects a point or location on the cylinder (e.g., along an axis of symmetry), then the cross-section (e.g., planar curve), spherical display, and/or point of the standard model, corresponding thereto, may be displayed. The user may use the data to identify features such as subterranean faults. For example, a user may select to scan image points, to view and display pairs of directional and reflection angle (e.g., or offset) displays corresponding to the selected image points. The user may search for pairs of displays, where the directional display has a single or narrow range of polar angles and the reflection display has multiple or a wide range of polar angles. Such pairs of displays may indicate, for example, that the corresponding image point is located on a fault line.

A polar angle may be, e.g., a two-dimensional vector (e.g., defined by a zenith and an azimuth angle). A zenith is, e.g., the angle between the radius-vector (connecting the center of the sphere to that point) and the polar axis of the sphere. An azimuth angle is, e.g., an angle between a reference direction in the equatorial plane and a projection of the radius-vector on the equatorial plane. Other angles, directions, orientations, relationships therebetween, and/or definitions thereof, may alternatively be used.

Each of the cylindrical, spherical, and standard displays may individually show different information corresponding to the same geophysical data or subsurface space. In some embodiments, when the cylindrical, spherical, and standard displays are simultaneously displayed (e.g., adjacently) the information of each may be compared. For example, while the user scans a column with a cursor, a corresponding indicator may scan a standard display to indicate to the user which geophysical location is being selected.

In another embodiment, the user may select (e.g., by clicking or highlighting) a geophysical location of the standard display to be displayed as a sphere or cylinder. The user may operate an input device (e.g., a mouse or keyboard) to manipulate, select, highlight, or otherwise indicate a seismic image point or a plurality of seismic image points corresponding to a line in a physical space. In response to such an indication, a display may display (e.g., on a graphical user interface) a representation of the indicated data to a user. For example, in one embodiment, a user may click or otherwise indicate a coordinate or point of the standard display and a corresponding spherical or other display may appear or "pop-up" (e.g., adjacent thereto). Likewise, a user may select (e.g., by dragging a cursor) a line or other plurality of points and a corresponding cylindrical display may pop-up (e.g., adjacent thereto). In a system having more than one monitor, a standard display may be displayed on one monitor, and details with specific data may appear on a second monitor or in a new separate window of the same monitor.

In other embodiments the displays may be rotated, translated, shifted, sliced, bent, rescaled, colored, zoomed and/or otherwise moved or reshaped.

It may be appreciated by one skilled in the art that although embodiments of the invention are described in terms of sphere or spherical display, other shapes may be used, e.g., ellipsoids, torus, hyperboloids, polyhedron, which may be, symmetric or asymmetric, and regular or irregular. It may be appreciated by those skilled in the art that although embodiments of the invention are described in terms of planar disks or flattened sphere, other shapes of 2D figures may be used, e.g., ellipses and other types of conical sections, polygons, or approximations thereof, etc. It may be appreciated by those skilled in the art that although embodiments of the invention are described in terms of cylinders, other shapes may be used, e.g., cones, prisms, pyramids, polyhedrons, etc., and/or geometric shapes having a line, or a plane of symmetry.

Reference is made to FIGS. 8A, 8B, 8C, 8D, and 8E, which are schematic illustrations of an image function defined on nodes arranged in various configurations, and maps therebetween, according to an embodiment of the invention. The specific figures and data points in each of FIGS. 8A-8E and the relationships therebetween are not limiting. It may be appreciated by those skilled in the art that these figures and the elements thereof are only examples and that other mechanisms, structures, relationships, mathematics, and abstractions, may be used to provide embodiments of the invention.

FIG. 8A shows an irregular discrete data set 815 representing the image function as defined on irregular nodes 810. FIG. 8B shows a regular discrete data set 825 representing the image function as defined on regular nodes 820 of a computational mesh 822. FIG. 8C shows a continuous curved three-dimensional surface 835 representing the image function as defined on spiraling nodes 830. FIG. 8D shows a curved planar surface 845, representing the image function as defined on planar nodes 840. The image function may be represented on the planar surface 845 by a two-dimensional region with a curved boundary (e.g., such as regions 365 and 465 of FIGS. 3 and 4, respectively). FIG. 8E shows a three-dimensional body 855 representing the image function as defined on nodes 850 of a cylindrical body. The irregular discrete data set 815, regular discrete data set 825, continuous curved three-dimensional surface 835, planar surface 845, and three-dimensional body 855 may be the values of the image function at the irregular nodes 810, regular nodes 820, spherical spiral nodes 830, planar curve nodes 840, and nodes 850 of the cylindrical body, respectively.

The image function may be any additional or other components or information. For example, the image function may be defined vs. a reflection angle, vs. offset, and/or directional data function. The value of the image function may be expressed, for example, as a color value on a color map.

The locations of the nodes of FIGS. 8C, 8D, and 8E typically do not correspond to the physical locations of the image points to which they correspond. For example, a node located to the relative "right" on the continuous curved three-dimensional surface 835 of FIG. 8C may correspond to a greater azimuth angle and not necessarily to a more eastern physical location of a subsurface or geophysical region. For example, a plurality of data points in FIGS. 8A and 8B describe a plurality of directions for a single physical point in a 3D space. These directions are arranged irregularly in FIG. 8A and regularly in FIG. 8B. "Regularly"

arranged nodes may indicate that a horizontal line in FIG. 8B represents, e.g., a latitude line, with a fixed zenith angle and variable azimuth. "Regularly" arranged nodes may likewise indicate that a vertical line in FIG. 8B represents, e.g., a meridian line or a subset of the meridian gather, with a fixed azimuth and variable zenith, related to a single physical point. Other arrangements of nodes may be considered "regular". For example, an alternatively regular arrangement of nodes may include nodes located at the vertices of a regular polyhedron (e.g., an icosahedron, which has 12 vertices and 20 faces) inscribed into a sphere. The vertices of the regular polyhedron may be the primary nodes of a regular grid. The regular grid may be refined by, e.g., splitting the faces of the polyhedron into regular (e.g., but not necessarily equal) pieces for generating other (e.g., additional) nodes of the regular grid. This alternate embodiment is, for example, described in further detail in reference to FIGS. 9A, 9B, and 9C.

Each of FIGS. 8A, 8B, 8C, and 8D typically represents the image function data corresponding to a single point (not shown) in a physical space and FIG. 8E typically represents the image function data corresponding to a plurality of image points (e.g., a line 880) in a physical space. For example, three-dimensional body 855 may include a plurality of planar surface 845, each representing an image point on a line of a physical space. Planar surface 845 may have a curved two-dimensional line or region for representing the image function at the image point. For example, the center points of each of the planar surface 845 may be stacked (e.g., along the line 880) according to the locations of their corresponding image point on the line of the physical space.

A first map 860 may be used to map input data from the irregular discrete data set 815 to the regular discrete data set 825. The first map 860 may be used to normalize or regularize irregular data. The first map 860 need not be used when the input data is already regular (e.g., defined at regularly spaced nodes of a coordinate system, where each node represents a definite polar angle, i.e., a fixed direction in three-dimensional space).

A second map 865 may be used to map input data from the regular discrete data set 825 to the continuous curved three-dimensional surface 835. Using the regular discrete data set 825, the second map 865 may be used to generate a continuous distribution of the image function for a single image point on the continuous curved three-dimensional surface 835. Data mapped to the continuous curved three-dimensional surface 835 may be represented on for example the spherical displays 100 and 200 of FIGS. 1 and 2.

Figure 9A:
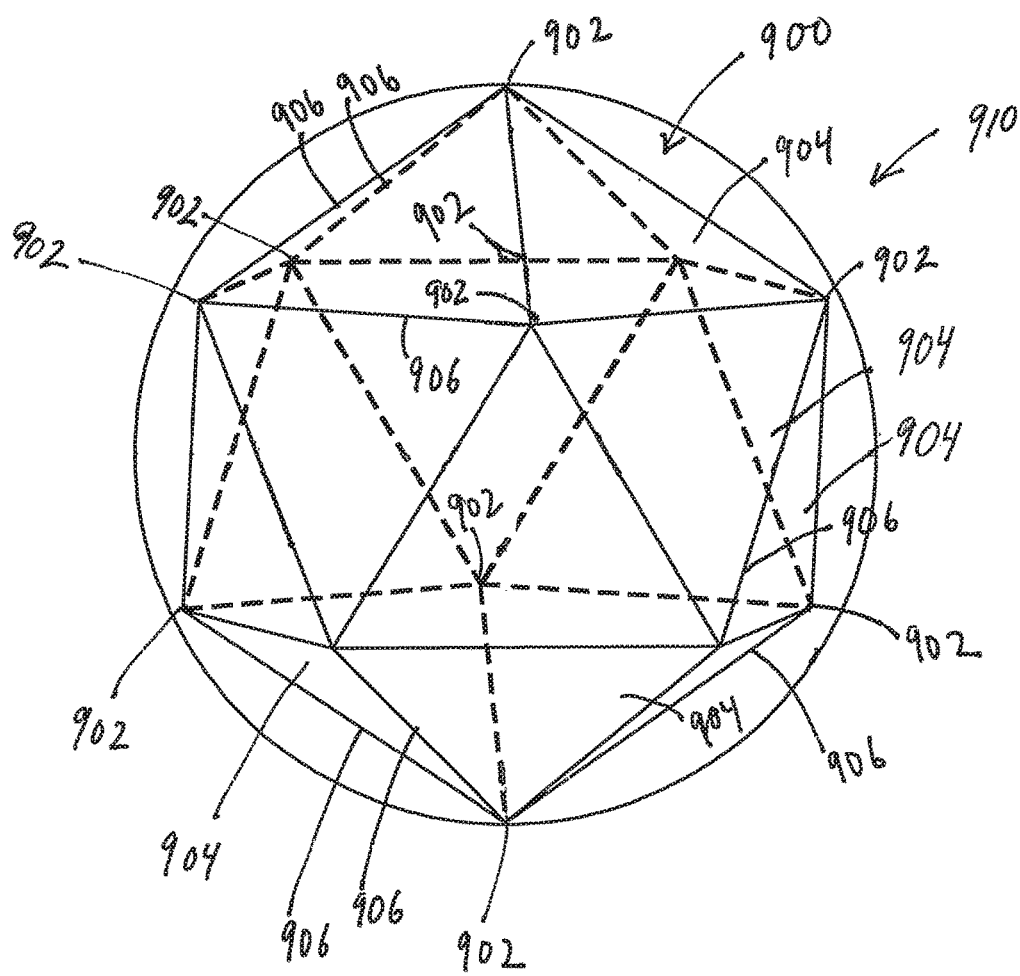
FIGS. 9A, 9B, and 9C, are schematic illustrations of stages of constructing a computational mesh, according to an embodiment of the invention.
Figure 9B:
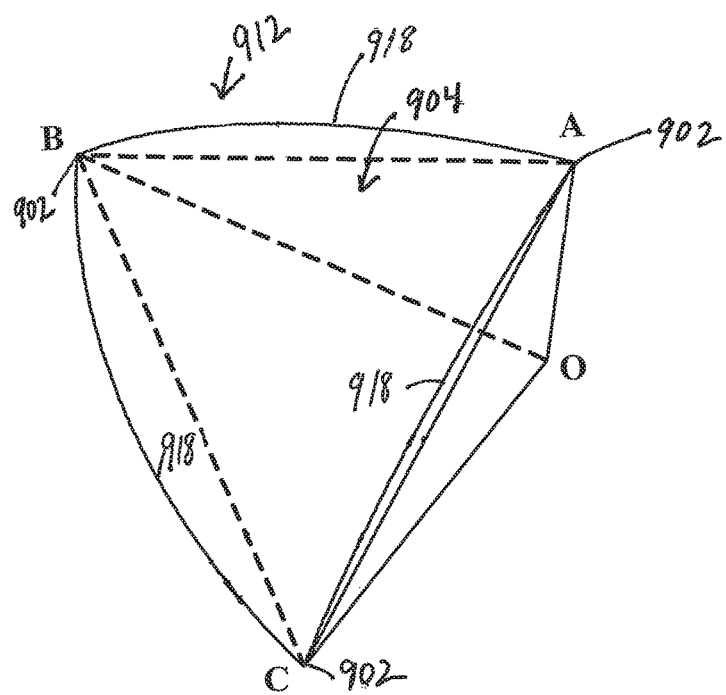
Figure 9C:
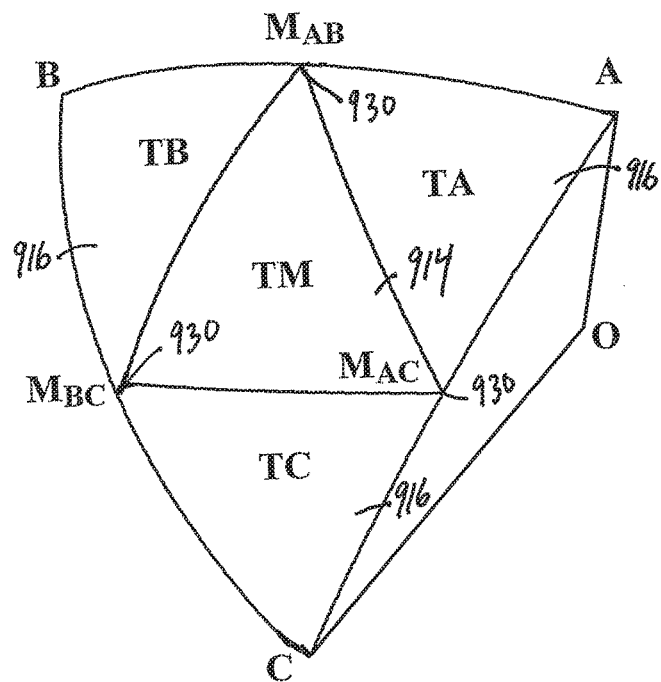

Operating on input data using the first and second maps 860 and 865 in order may be referred to as "gridding". Operating on input data using the second map 865 but not the first map 860 may be referred to as "interpolation". Therefore, interpolation may be a sub-operation of gridding. First and second maps 860 and 865 are described in further detail herein, e.g., in the section titled, "Spherical Gridding". The construction of the nodes 820, which may be collectively referred to as a "computational mesh" 822, is described in further detail herein, e.g., in the section titled, "Computational Mesh" and in reference to FIGS. 9A, 9B, and 9C. FIGS. 9A, 9B and 9C describe a mechanism for generating a regular mesh (e.g., computational mesh 822 of FIG. 8B). The regular mesh may be generated on a sphere. The mesh described in 9A, 9B, and 9C has cells of approximately equal area, or at least, cells of similar areas. The mesh preferably does not have singularities at the poles of the sphere.

A third map 870 may be used to map input data from the continuous curved three-dimensional surface 835 to the curved two-dimensional surface of the planar surface 845. The third map 870 may be, for example, a projection map, of the continuous curved three-dimensional surface 835 or any other map for flattening or transforming or expanding the continuous curved three-dimensional surface 835 to the planar surface 845. A projection map may describe a surjective or "onto" map as are known in the art. A projection map may describe a function for mapping data from a first coordinate space (e.g., N-dimensional) to a second (e.g., N−1 dimensional) coordinate space. Alternately, third map 870 may be, for example, an expansion map. The expansion map may project a three-dimensional surface into a two-dimensional surface by "unraveling" or "unfolding" the three-dimensional surface. The third map may include other or additional projections, such as, e.g., cylindrical, pseudo-cylindrical, hybrid, conical, pseudo-conical, azimuthal (projections onto a plane), conformal, equal-area, equidistant, gnomonic, retro-azimuthal, compromise projections, or the like.

A fourth map 875 may be used to map input data from a set of the planar surfaces 845 to the three-dimensional body 855. The fourth map 875 may be used to generate a continuous distribution of the image function for a plurality of image points (e.g., corresponding to a line in a physical 3D space) on the three-dimensional body 855. Data mapped to the three-dimensional body 855 may be represented on the cylindrical displays 300 and 400 of FIGS. 3 and 4.

Embodiments of the invention include operating on a discrete data set (e.g., irregular or regular discrete data sets 815 and 825, respectively) representing a single or a plurality of image points of a physical 3D space with a sequence of maps in a predetermined order (e.g., first map 860, second map 865, third map 870, and/or fourth map 875) to generate a continuous curved three-dimensional surface 835 (e.g., a sphere) and a three-dimensional body 855 (e.g., a cylinder), respectively.

It may be appreciated by those skilled in the art that maps described herein are only one example and that other maps, functions, transformations, or relationships may be used to map data between the various nodal configurations, e.g., irregular nodes 810, regular nodes 820, spiraling nodes 830, planar nodes 840, and/or cylindrical nodes 850. It may be appreciated by those skilled in the art that any map(s) may be combined or separated into other and/or different numbers of maps to perform equivalent operation(s). It may be appreciated by those skilled in the art that nodes and the configurations thereof described herein are only one example and that configurations or arrangements or nodes other than irregular nodes 810, regular nodes 820, spherical spiral nodes 830, planar surface nodes 840, and/or cylindrical nodes 850 may be used to represent equivalent information.

Figure 2:
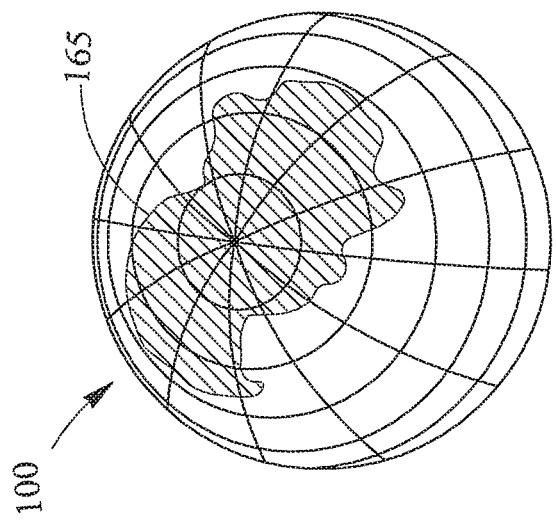
FIG. 2 is a schematic illustration of a spherical display of the directional data, associated with a single image point, according to an embodiment of the invention.
Figure 4:
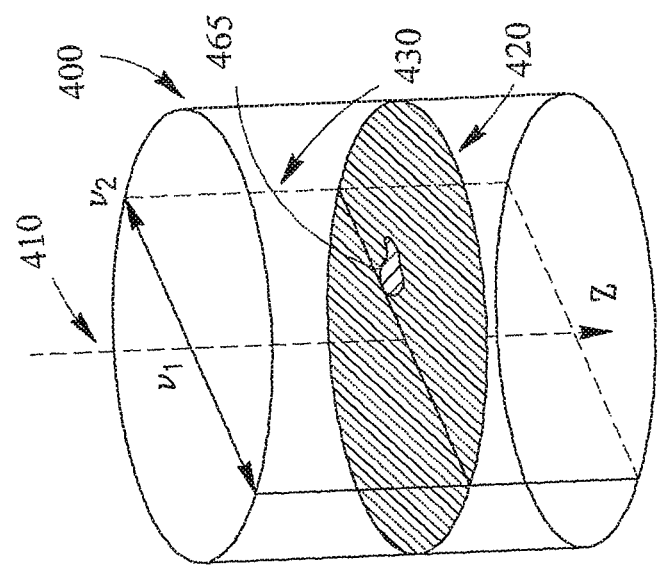
FIG. 4 is a schematic illustration of a cylindrical display of directional data associated with a plurality of image points, according to an embodiment of the invention.
Figure 3:
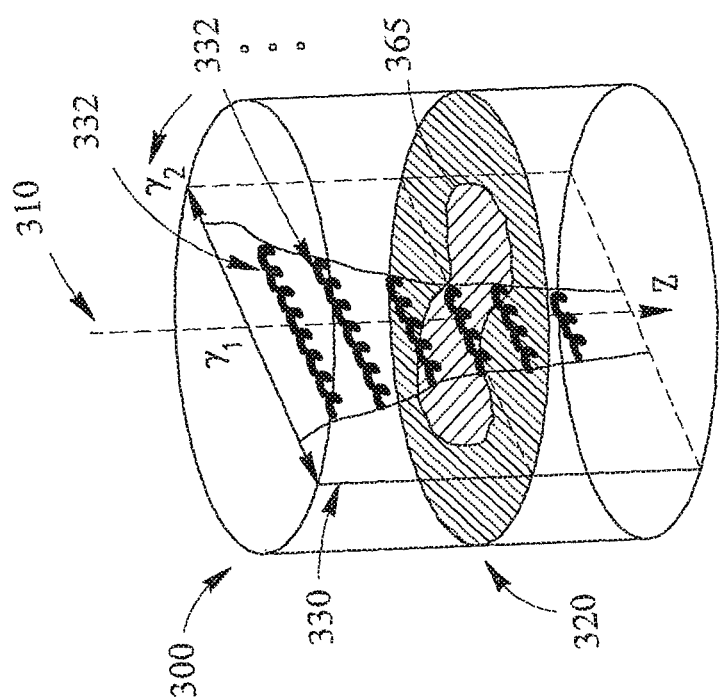
FIG. 3 is a schematic illustration of a cylindrical display of reflection angle data associated with a plurality of image points, according to an embodiment of the invention.

Embodiments of the invention provide a system and methods for displaying continuous full-azimuth angle domain image data and/or wide-offset domain image data at a given image point of the discrete data set such as data set 815 of FIG. 8 (e.g., on the spherical displays 100 and 200 of FIGS. 1 and 2) or at a set of image points (e.g., on the cylindrical displays 300 and 400 of FIGS. 3 and 4). The full-azimuth angle and/or wide-offset domain image data of the discrete data sets 815 and 825 may include, for example, angle domain common image gathers (ADCIG) and offset domain common image gathers (ODCIG), respectively. Embodiments of the invention include accepting the (e.g., azimuthally) discrete data set, mapping the discrete sets of data to the continuous curved three-dimensional surface 835, for example, creating three-dimensional ADCIGs in the directional or reflection angle domains. Embodiments of the invention include, for each image point, using, for example, spherical gridding mechanism or other methods or techniques for interpolating and extrapolating data onto a spherical or otherwise curved surface. It may be appreciated by those skilled in the art that techniques other than spherical gridding (e.g., the first and second mappings 860 and 865 in FIG. 8) or interpolation (e.g., only the second map 865) may be used for generating spherical, cylindrical, or otherwise shaped displays for representing wide-azimuth data, as described herein. Embodiments of the invention include projecting the data represented on the curved surface to a planar surface. For a gather of image points (e.g., an ADCIG), embodiments of the invention include combining the data sets associated with several planar surfaces into a three-dimensional body, such as a circular cylinder or other cylinder. It may be appreciated by those skilled in the art that shapes other than spheres and cylinders may be used.

Embodiments of the invention include a mechanism for mapping angle dependent image point data onto a spherical or otherwise curved surface, using, for example, a spherical gridding, interpolation/extrapolation or other methods. Embodiments of the invention include displaying angle dependent image point data on a spherical or otherwise curved surface. The image function data (e.g., the reflectivity) may be displayed as a function of the direction angles, reflection angles, and/or offsets. Embodiments of the invention include projecting or expanding the data defined on a curved surface to the data defined on a planar surface. Embodiments of the invention also include cylindrical displays for displaying simultaneously image data for a plurality, for example, a gather of image points (e.g., a set of image points located along a vertical line at a given horizontal location). As described in the referred patent U.S. patent application Ser. No. 11/798,996, full-azimuth angle gathers (e.g., ADCIGs) may be used to generate a spherical spiral geometry. These types of gathers may be referred to as "Spiral ADCIGs", where a directional gather may be referred to as a "Spiral-D" and a reflection gather may be referred to as a "Spiral-R".

It may be appreciated by those skilled in the art that embodiments of the present invention may be applied to any seismic processing and imaging system. Embodiments of the present invention may be used for generating displays and visualizations in various areas or fields, such as, for example, exploration and production of oil and gas, imaging of the shallow earth model for environmental study (e.g., using data collected using seismic and/or ground penetration radar (GPR) methods), construction engineering (e.g., to identify locations of pipes), construction safety and security (e.g., to identify holes and channels), medical imaging (e.g., using computed tomography (CT), magnetic resonance imaging (MRI), and ultra-sound devices), non-destructive material inspection, inspection of internal items for security reasons (e.g., homeland security), marine sonar, and antenna and radar systems.

The Proposed Displays

Reference is made to FIGS. 1-4, which are schematic illustrations of displays or visualizations of continuous data according to embodiments of the invention. FIGS. 1 and 2 are spherical displays related to a specific image point, according to one embodiment. FIGS. 3 and 4 are cylindrical displays related to a specific gather of image points, according to one embodiment. The data displayed in FIGS. 1-4 may be data additional to that typically shown in standard displays. For example, these displays may be generated at the request of a user to have a "closer look" or additional information associated with one or more data points of a geophysical region. The additional information may include for example an image function of reflection angle, offset, and directional data for the one or more data points.

Displays 100, 200, 300, and 400 may be generated for example by the mapping of data as shown in FIGS. 8A, 8B, 8C, 8D, and 8E, although other methods of creating these displays may be used. The input data for the displays may be discrete data set 815 or 825, for example, of an image function defined at a plurality of discrete nodes 810 and 820 of FIG. 8 (e.g., referred to as "control points"). The location of nodes 810 and 820 may be defined by a discrete geometry. The nodes 810 and 820 may be irregularly and regularly spaced, respectively, with respect to a coordinate system (e.g., a spiral coordinate system).

Embodiments of the invention may include a gridding mechanism (e.g., using first map 860 of FIG. 8) for normalizing the irregular discrete data set 815 to generate the regular discrete data set 825. The regular discrete data set 825 may be interpolated (e.g., using second map 865) to generate the continuous curved three-dimensional surface 835. The continuous curved three-dimensional surface 835 may represent the image function at a single image point.

In one embodiment, the discrete data set 825 of FIG. 8*may* be mapped or transformed by second map 865 to a continuous surface by simulating the elastic bending of a thin shell reinforced by "springs" or elastic structures. In one embodiment, "springs" may be data abstractions supporting the nodes of the shell at discrete control points. For example, the "springs" may be, contracted, or expanded, to shift, "squeeze", or reorient, the nodes 810 and/or 820 in order to provide a better coincidence of the deformed shell with the data values at the reference nodes, such as, the spiraling nodes 830 of the continuous curved three-dimensional surface 835, as described herein. It may be appreciated by those skilled in the art that techniques other than spherical gridding and/or interpolation may be used for generating a continuous image function, as described herein.

In some embodiments, exact accuracy is not required for a gridding mechanism. Instead, a gridding mechanism may be adjusted for achieving a balance between accuracy and a continuity of gridding. "Springs" may be used to provide a better continuity of gridding. It may be appreciated that the "springs" and the use and elasticity thereof, as described herein, are data abstractions and computational abstractions, and may be represented by comparable software programs or sets of instructions, mathematical equations, data value, and/or visual representations.

In some embodiments, when control points or nodes 810 and/or 820 are shifted toward the in-line or cross-line directions, there may an option to "squeeze" the computational mesh 822 (e.g., and corresponding or spherical displays 100 or 200 of FIGS. 1 and 2), for mapping the discrete nodes 810 and/or 820 to the continuous curved three-dimensional surface 835 that better fits the real image data, such as, a spheroid or a general ellipsoid with all three axes distinct (e.g., scalene ellipsoid).

In some embodiments, "squeezing" may include transforming, distorting, refitting, resizing, reshaping, or other manipulation effects to alter a shape of the continuous curved three-dimensional surface 835 and/or computational mesh 822 (e.g., as described herein) used to generate the shape.

In one embodiment, the discrete data set may be defined on discrete nodes of a spiraling geometry, for example, as described in U.S. patent application Ser. No. 11/798,996. For example, with a spherical spiral discretization, the location of input points may be described by a single parameter, e.g., the normalized area swept by spiral coils or the normalized arc length of spiral. The display mechanisms may include spherical gridding or other interpolation or extrapolation techniques, such as for example, local spherical interpolation, or Fourier transform on a spherical surface. These mechanisms may map an image function defined at discrete regular or irregular nodes 810 and/or 820 onto a spherical or otherwise continuous curved three-dimensional surface 835, with a continuous distribution of the image function defined through a corresponding (e.g., "squeezed") curved surface.

The gridding mechanisms described herein are non-limiting examples of many possible methods for transforming or a mapping a discrete data set 815 and/or 825 to a continuous curved three-dimensional surface 835.

Other gridding mechanisms, maps, and/or transformations, may be used.

Spherical Gridding

Objective of Spherical Gridding

"Normalization" may refer to for example mapping irregular data to a regular data set (e.g., using first map 860). "Interpolation" may refer to for example, using discrete data to generate a continuous distribution of an image function (e.g., using second map 865). "Gridding" may refer to for example the combined steps of normalization and interpolation, for example, executed in that order.

Embodiments of the invention may include interpolating or mapping a discrete data set such as data sets 815 or 825 of FIG. 8 of an image function to a continuous image function on a continuous curved three-dimensional surface such as surface 835 (e.g., using first and/or second maps 860 and 865).

The discretely defined image function may be defined on an input grid of nodes 810 or 820. When the nodes 810 of the input grid are irregular, a standardized or uniform grid may be used to regularize or normalize the input grid to generate an output grid of nodes 820 defining a continuous image function. For example, the data in the input grid that differs from the uniform grid may be adjusted to fit (e.g., using first map 860). The input grid may be for example a spiral coordinate system. The output grid may be a conventional spherical mesh with constant resolutions in zenith and azimuth, or any other conventional visualization mesh on a spherical surface or other curved surface. Other grids may be used.

Embodiments of the invention include a gridding mechanism to interpolate an image function at a point onto a continuous spherical, ellipsoidal, or otherwise curved three-dimensional surface 835 (e.g., using second map 865). The curved three-dimensional surface 835 may be displayed as spherical displays 100 and 200 representing the reflection angle image function and the directional data, respectively, in FIGS. 1 and 2, for a single point.

The interpolated image functions for each point may be flattened or projected to the curved two-dimensional surface of planar surface 845 (e.g., using third map 870), for a single point.

A plurality of curved two-dimensional planar surfaces 845, each representing the image function at a point, may be stacked along the line 880 to form a cylindrical or other three-dimensional body 855 (e.g., using fourth map 875), representing the image function at a plurality of points. The three-dimensional body 855 may be displayed as displays such as cylindrical displays 300 and 400 representing the reflection angle image function and the directional data, respectively in FIGS. 3 and 4, for a plurality of points. The position at which each of planar surfaces 845 is stacked along the line 880 may, for example, correspond to the relative spatial arrangement of the image point represented thereby. Thus, a user may scan the line 880 in a direction (e.g., "upward") to display cross-sections of the cylindrical display (e.g., as planar surfaces 845 or corresponding three-dimensional surfaces 835 unflattened by an inverse map of 870) of the image function at different image points of the physical universe in a corresponding (e.g., "upward") direction.

The initial image function may be defined at discrete control points (e.g., irregular or regular nodes 810 or 820). Embodiments of the invention provide first and/or second map 860 and/or 865 to generate a continuous distribution of the image function on a curved three-dimensional surface 835 from input points of the discrete data set 815 or 825. The components of the polar angles (e.g., zenith and azimuth) of the input (e.g., control) points may be presented in, e.g., a Cartesian coordinate system or a spherical coordinate system (e.g., at the nodes of a spherical or ellipsoidal spiral), or other coordinate systems. The input points may have any locations, may be regularly or irregularly spaced, and may be arranged in any suitable order or sequence. The output function may be a continuous image function defined at any point or at all points of the spherical or ellipsoidal surface, or at all points of a part of the surface (e.g., such as a spherical hemisphere or "ellipsoidal cap"). It may be appreciated that different positions on the curved three-dimensional surface represent a single physical point in a 3D space and a plurality of directions corresponding to the point. At the control points (e.g., irregular nodes 810), the output values may coincide or nearly coincide with the input data. In some embodiments, an adjusting parameter (e.g., such as weights of the data at the control points) may be applied to the interpolation map (e.g., as part of the first map 860) for balancing the benefits of continuity (e.g., smoothness) of the distribution and accuracy of the solution to the image function at the control points (e.g., achieving a best fit for matching the input and output data of the interpolation function). In some embodiments, the output image function may be generated to exactly match the control or input data. Alternatively, the output image function need not exactly match the input image function. In such embodiments, when the exact fit requirement is relaxed, the output image function may be a more smooth and continuous distribution of the mapped function through the curved surface with smaller gradients.

Gridding may include simulating the elastic bending of a thin shell or computational mesh 822 of FIG. 8B, reinforced by springs. This model is only one of a variety of possible approaches, and other models and approaches may be used. It may be appreciated by those skilled in the art that the shell and the springs are abstractions, and that there is no real physical structure that comprises shell and springs. The spring abstraction may be located at the nodes of control points. Typically, an exact match between the interpolated (e.g., output) function and the input function at the control points is not required. The spherical gridding method may be used to interpolate image data, for example, when the angle domain is not fully illuminated.

Spherical Gridding in the Local Angle Domain

The system of incident and reflected waves (e.g., or ray pairs) defining a geophysical region may be defined by the directional and reflection subsystems of the local angle domain (LAD). The directional system may include two components of polar angles describing the zenith (e.g., dip)

and the azimuth angles of the normal to the reflection surface element. The reflection system may include two components describing an opening angle between incident and reflected rays and an opening azimuth or alternatively, an offset magnitude and an offset azimuth, where the offset is specified on the earth's surface. Together, the directional and reflection subsystems may define the position of each image point in the LAD.

For each image point, two angle domain imaging systems may be created, e.g., the directional and reflection subsystems. Other than two angle domain imaging systems may be used. Both imaging systems may be defined on a curved surface, such as, the unit sphere (e.g., the reflection subsystem in FIG. 1; the direction subsystem in FIG. 2). A point on the curved surface may be defined by two components of the polar angle (e.g., the zenith and azimuth). Each point in the direction system on the spherical surface may correspond to a certain direction of the inward normal to the reflection element, with all possible reflection angles and their azimuths summed. Each point in the reflection system on the spherical surface may correspond to a certain opening angle and opening azimuth, with all possible directions of the ray pair normal summed up.

Other subsystems, angles, components, or relationships thereof may be used.

Principles of Spherical Gridding

The term "interpolating" may be used for example to describe estimating function values at (e.g., arbitrary or specific) points between nodes, where the nodes or control points may be evenly or regularly spaced. The term "gridding" may be used for example to describe interpolating, where the nodes may be irregularly spaced. Thus, gridding may be a more general form of interpolation and interpolation may be considered a stage of the gridding procedure. In the interpolation problem, a function may be defined at evenly (e.g., or at least regularly) spaced grid nodes of an n-dimensional space. In the gridding problem, the input points may be irregularly spaced (e.g., not necessarily at the grid nodes). In one embodiment of the gridding technique, an input mesh may not exist and the input control points may be an unordered or random collection of points in a finite (e.g., or bounded) space. In this embodiment, the gridding mechanism may generate a continuous distribution of a function estimating all points of the finite space.

The gridding procedure may include generating a regular computational mesh, e.g. 822 (e.g., and the values of an image function estimated at the spiraling nodes 830) and interpolating the image function between mesh nodes 830 for generating a continuous output image function. The input image function may be fit exactly, or alternatively, approximately, to the output image function. When the input and output data are fit to match less than perfectly, the output data may be fit to be more continuous (e.g., having fewer and/or less drastic discontinuities).

When generating the regular computational mesh 822, the unknowns may be the nodal values of the image function. Between the nodes, the function behavior may be defined by, for example, interpolation polynomials. To find the nodal values, the energy of the surface defined by the image function may be minimized, for example, taking into account the control values, either exactly (e.g., to generate the exact output values at the control points), or using additional energy terms (e.g., for greater continuity).

When an image function is displayed on a surface such as continuous curved three-dimensional surface 835, e.g., as a thin elastic shell, shell elastic displacements may be modeled by the image function, and the energy per unit area (e.g., the specific energy) may be approximated by the curvature of the shell squared. The surface defined by the image function (e.g., having minimized energy) may be an elastically deformed surface that initially (e.g., before deformation) had a spherical, an ellipsoidal, or another curved form. The surface may be supported by pre-stretched springs at the locations of control data points. In such embodiments, the input data may be approximately fit. Alternatively, normal displacements may be specified at the control points. In such embodiments, the input data may be exactly fit.

After the grid values at nodes 820 are established for generating for example the computational mesh 822, the same interpolation polynomials may be used for interpolation to estimate the image function values at arbitrary points between the regularly spaced nodes 820 of the computational mesh 822, for example, at nodes 830 of the spiraling geometry, or at the other nodes. Therefore the stages of interpolation, e.g., generating the computational mesh 822 and interpolating the image function along the mesh, are typically related.

Gridding through a planar or curved surface (spherical, ellipsoidal, etc.) may provide the function values at the spiraling nodes 830 or control points as well as partial derivatives (gradient components) of the function at the control points. For an ellipsoidal surface, the partial derivatives of the function at the control points may be the derivative of the image function with respect to the zenith and having a constant azimuth, with respect to the azimuth and having a constant zenith, or with respect to the azimuth and having a constant vertical coordinate (e.g., which may be a different embodiment for a scalene ellipsoid). In addition, the derivative of the input function may be determined in any arbitrary direction on a curved surface.

Computational Mesh

The complexity of a computational mesh used with embodiments of the invention, such as the computational mesh 822, may be defined by for example the number of recursion levels used to generate the mesh. The mesh may be generated on the unit sphere or any other n-dimensional space. When the three-dimensional curved surface is different from the unit sphere (e.g., an ellipsoid) the mesh may be generated on the unit sphere and then formed into another (e.g., ellipsoidal) shape.

Reference is made to FIGS. 9A, 9B, and 9C, which are schematic illustrations of stages of constructing a computational mesh according to embodiments of the invention, such as the computational mesh 822, according to an embodiment of the invention. The computational mesh 822 (e.g., the generated mesh) is regular, and may or may not be uniform. The specific figures and mechanism described in reference to FIGS. 9A-9C are not limiting. It may be appreciated by those skilled in the art that these figures and the elements thereof are only examples and that other mechanisms, structures, relationships, mathematics, and abstractions, may be used to provide embodiments of the invention.

In one exemplary embodiment, the computational mesh 822 of FIG. 8C may be initially formed from a polyhedron 900 of FIG. 9A, such as, a regular icosahedron with (e.g., 12) vertices 902, (e.g., 20) triangular faces 904 and (e.g., 30) edges 906, e.g., inscribed in a sphere 910. This geometry may correspond to the zero recursion level for generating a computational mesh such as the computational mesh 822. Other shapes, polyhedrons, and numbers may be used.

To obtain the next level of recursion, in FIG. 9B, flat triangular faces 904 may be replaced by spherical triangles 912 (e.g., having curved face and/or edges). For example, points A, B and C are vertices 902 of an arbitrary one of triangular faces 904. Point O is the center of the sphere 910 and lines OA, OB, and OC are radii of the sphere 910. Lines AB, BC, and CA, the edges of the triangular faces 904 of the polyhedron 900 (e.g., icosahedron), may be replaced by curved approximations of the lines 918, such as, arcs of "great circles" (or geodesic curves).

To obtain the next level of recursion, in FIG. 9C, each spherical triangle ABC 912 may be split by medians into (e.g., four) derivative spherical triangles: (e.g., three) peripheral triangles 916 (of the same area), labeled TA, TB and TC and (e.g., one) central triangle 914 (of different area), labeled TM in FIG. 9C. For example, in FIG. 9C new points 930, $M_{AB}$, $M_{BC}$ and $M_{AC}$, e.g., the centers of spherical arcs AB, BC, and AC, respectively, may form additional vertices 902, triangular faces 904, and edges 906 forming a new polyhedron, e.g., different from polyhedron 900 (e.g., having more vertices, faces, and edges). Each new edge 906 may yield an additional node 930, for example, giving a polyhedron with e.g., 42 nodes (of course other numbers of nodes may be used).

Such a procedure may be repeated multiple times, e.g., each time the level of recursion increasing by one.

For the last (e.g., highest) level of recursion, the spherical triangles 912 may be approximated by flat triangular faces 904. The gridding may be modeled by bending deformations of a three-dimensional spatial elastic shell consisting of the flat triangular faces 904 (e.g., corresponding to the last level of recursion). As the number of recursions increases, the polyhedron 900 converges to approximate the sphere 910 of FIG. 9A. At a certain recursion level (e.g., 4 or 5, although other numbers may be used), the surface of the polyhedron 900 may be determined to be sufficiently close to spherical.

The vertices 902 of the polyhedron 900 of FIG. 9A may be the nodes 820 of the computational mesh 822 of FIG. 8B. The spherical shell may be simulated to be resting on pre-loaded springs located at the control points. Thus, the spring locations need not necessarily coincide with the mesh nodes. The direction of the force exerted by a spring may be normal to the spherical or the ellipsoidal surface at the control point. The elastic displacements at the shell nodes may be calculated, for example, by the Finite Element Method.

The nodes 830 may be numerated globally, for example, in a specific manner: first the "north pole", having the highest z coordinate, then the nodes of the northern hemisphere having the next z level and other z levels, then the equator, the levels of the southern hemisphere, and finally the south pole, having the lowest z coordinate. This numeration method may yield a small or minimal band width of a resolving matrix. Other numberings, and other methods of global numbering, may be used.

The whole sphere or ellipsoid need not be analyzed at once. In some embodiments, the input data (e.g., the control points) may be located within a definite range of zenith angles, for example, that do not exceed a pre-defined maximum zenith value. In such embodiments, only a part of the whole surface (e.g., a spherical or an ellipsoidal cap) may be analyzed.

In embodiments when the reflection subsystem includes the offset value and the offset azimuth (e.g., instead of the opening angle and the opening azimuth), gridding may be performed on a flat (e.g., planar) surface (e.g., instead of a spherical surface). Since angle gather data typically corresponds to different directions at an image point or at a set of image points (e.g., along a vertical line), different directions at a single point may be represented by a curved surface, such as a spherical surface. In contrast, an offset gather (e.g., or the specific physical location in depth thereof) typically corresponds to different lateral shifts between the source and the receiver on the surface of the Earth. These shifts typically have, e.g., two Cartesian components, x and y, and the Earth surface and are represented by a planar or flat surface.

Northern and southern hemispheres are relative terms describing regions above and below an equator (e.g., the widest circumference of an oriented body), respectfully. Similarly, terms such as equator, meridian, south, north, vertical, horizontal, lateral, perpendicular, or other orienting terms are relative terms, depending on a viewer's perspective or vantage point.

Spherical Display

Reference is again made to FIGS. 1 and 2, which show spherical displays, related to a specific image point, for the reflection and directional subsystems, respectively. The output data for the displays 100 and 200 (e.g., of continuous curved three-dimensional surface 835 of FIG. 8C) may be specified at the nodes of spherical or ellipsoidal surface (e.g., spiraling nodes 830 of FIG. 8C). The shape of the displays 100 and 200 may be determined by the construction of the computation mesh 822 of FIG. 8B (e.g., as described in reference to FIGS. 9A, 9B, and 9C). The displays may be for example continuous spherical or ellipsoid surfaces, or portions (e.g., a cap) thereof. In some embodiments, there may be a plurality or range of colors that corresponds to the range of the image function values. The surfaces of the displays may have a color or other visual indication at each point corresponding to the image function value at that point.

In FIGS. 1 and 2, different colors are represented by differently shaded (e.g., cross-hatched) regions 165 and 265, respectively. The display may provide numerical output values (e.g., corresponding to the representative color value) at any point of the curved surface, for example, when the point is selected or highlighted by a user. The display may provide the input values corresponding to the interpolated or gridded displayed output values, for example, for comparison between the input and the output values at the control points.

The accuracy of the gridding and the visualization may be defined for example, by the computational complexity and the visualization complexity. The computational complexity may be the number of recursion levels of the computational mesh 822. The visualization complexity may be a similar number, for example, of the sectioning of the graphics grid. Typically, these two numbers coincide, or are close. The display may be rotated, shifted, zoomed, enlarged, sectioned, inverted, or otherwise transformed or translated.

Cylindrical Display

Reference is again made to FIGS. 3 and 4, which show cylindrical displays 300 and 400, each related to a plurality of image points, for the reflection and directional subsystems, respectively. Each of cylindrical displays 300 and 400 may be formed as an assemblage of multiple planar disks (e.g., curved two-dimensional planar surface 845 of FIG. 8D by the fourth map 875). Each planar disk may be formed by projecting the continuous curved three-dimensional surface 835 (e.g., a sphere, ellipsoid, or otherwise 3D curved surface) onto a plane or 2D space. Each curved 3D surface may represent a point (e.g., having a physical location in the Cartesian coordinate system). Thus, each 3D body or cylindrical displays 300 and 400 may represent a plurality of points (e.g., each having a unique depth). The cylindrical displays may represent image points defined by coordinates other than depth. In one embodiment, cylindrical displays 300 and 400 may display substantially simultaneously a plurality (for example, a gather) of image points, in an integrated display. For example, each display 300 and 400 may correspond to a set of two or more image points with substantially the same lateral location and substantially different depths.

Consider several directional displays (e.g., FIG. 2) or reflection displays (e.g., FIG. 1) in spherical/ellipsoidal spiral coordinate system. A display may correspond to a gather of image points with the same lateral location and different depths. Initially the parameters of these spirals (e.g., elevation, maximum zenith angle, segment area, etc.) may be different. Thus, there may be several different spiral representations of the computed data (e.g., image function), corresponding to different depths of the gather nodes. In addition, there may be a visualization spiral to which parameters may be assigned. The maximum zenith angle of the visualization spiral may be the largest maximum zenith angle for all gather nodes at different depths. To construct a common cylindrical display 300 and/or 400 for all image points of the gather, the computed data may be regularized or normalized to fit the nodes of the visualization spiral. Regularization may be carried out for each individual node in depth, and may include, for example, two stages. First, gridding may be performed for the input data at the control points with specific angular locations, corresponding to the given input or non-regularized spiral. The input spirals may be different for different depths. For the reflection subsystem gather, the maximum zenith angle (e.g., the maximum opening angle) typically decreases with depth. Theoretically, the maximum opening angle may vanish at infinite depth. After gridding, the values of the image function may be determined or scanned at any point of the spherical or ellipsoidal surface. In one embodiment, the values of the image function may be "read" at the nodes of the visualization spiral (e.g., nodes 830 of the continuous curved three-dimensional surface 835 of FIG. 8C). The visualization spiral may be the same for all nodes (e.g., all depth indices) of the gather. Alternatively, the visualization spiral may be differently shaped or have different nodal arrangements or ordering at one or more different nodes at depths of the gather, for example, to accommodate for inconsistent data.

A gridding technique may be performed independently for each spherical or ellipsoidal surface (e.g., of FIGS. 1 and 2) (e.g., for each node in depth). Alternatively, a gridding technique may be performed simultaneously, one time, or according to the same parameters, for the whole gather or portion thereof. The latter method may increase the computational complexity of gridding, but may provide a more continuous vertical distribution of the image function.

In one embodiment, the visualization spiral data set for each node of the gather may be mapped to a continuous distribution, generating a spherical or ellipsoidal display. The spherical or ellipsoidal display generated for each vertical node of the gather may be projected, flattened or expanded, into a planar circular, elliptic or elliptic-like, or otherwise planar 2D region. In one embodiment, the polar radius of a point on the curved 2D region may be equal or proportional to the zenith angle on the spherical display. The azimuth values of the points on the 3D spherical and flattened 2D displays are typically the same.

Note that for the reflection subsystem representing the offset magnitude and the offset azimuth, each single-node of the gather may be originally defined on a planar surface, and need not be projected or expanded onto a plane.

A set of planar displays (e.g., circular or planar curved-line non-circular) created for the nodes of the gather with the same lateral location and different vertical locations may form each cylindrical display 300 and/or 400.

In one embodiment, reflection and directional subsystem cylindrical displays 300 and 400 may include horizontal cross sections 320 and 420 and vertical cross sections 330 and 430 thereof, respectively. Horizontal cross sections 320 and 420 may be normal to axes 310 and 410, respectively, and vertical cross sections 330 and 430 may be parallel to axes 310 and 410, respectively. Each horizontal cross section 320 and 420 may be, for example, a projected, flattened, or reduced dimensional representation of reflectivity and directional spherical displays 100 and 200, respectively. Horizontal cross sections 320 and 420 may include regions 365 and 465. Regions 365 and 465 may be, for example, projected, flattened, or reduced dimensional representation of reflectivity vs. reflection and directional component angles of regions 165 and 265, respectively, for an image point. A color map including a plurality of colors may correspond to a range of the image function values. In FIGS. 3 and 4, different colors are represented by differently shaded regions 365 and 465, respectively. The color map may be the same color map as used for the spherical displays in FIGS. 1 and 2 for the corresponding image point of the gather. Alternatively, a different color map may be used. Other methods of displaying image function values may be used, such as e.g., grayscale, brightness, luminosity, cross-hatching, etc.

Figure 7:
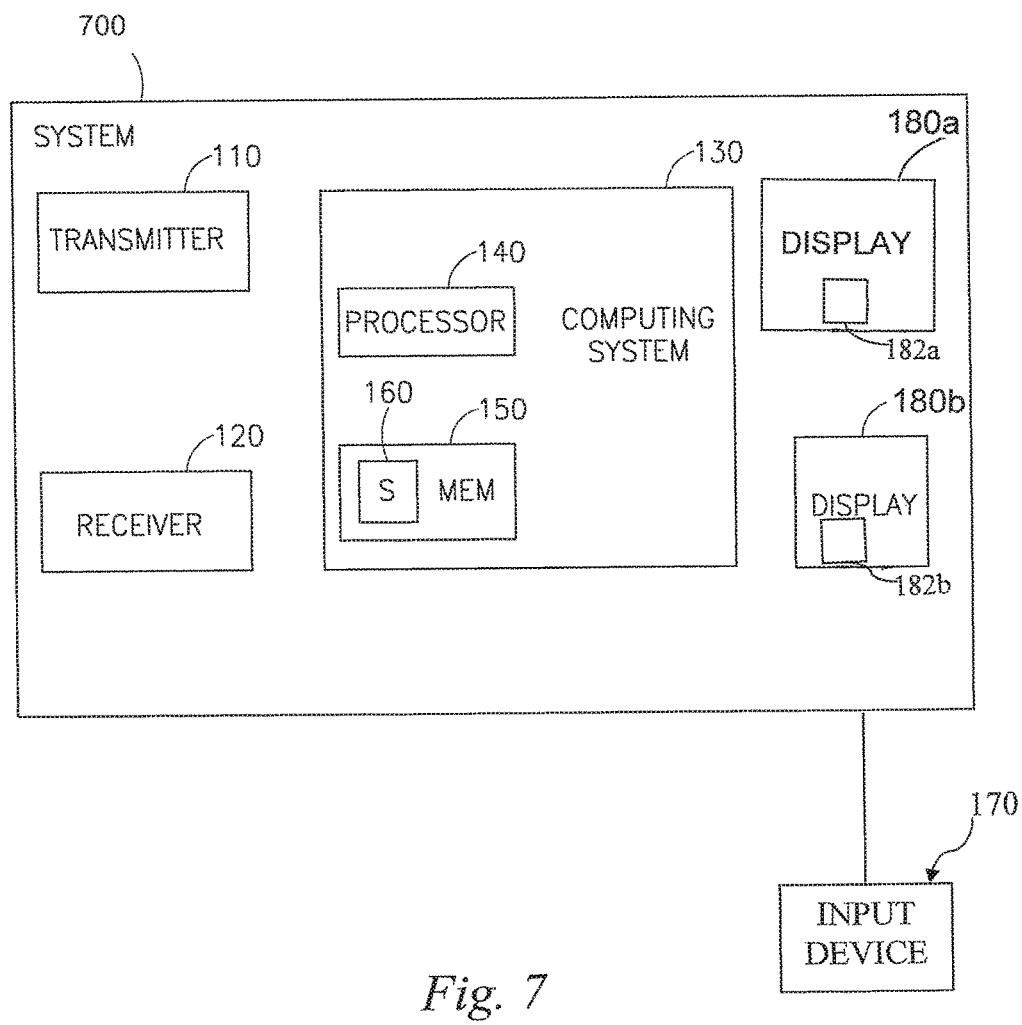
FIG. 7 is a schematic illustration of a system, according to an embodiment of the invention.

A user may view displays on a graphical user interface (e.g., graphical user interface 182a and/or 182b of FIG. 7).

Horizontal cross section 320 and 420 may correspond to a specific image point of the gather (e.g., with a specific vertical location). Horizontal cross sections 320 and 420 may show the reflectivity function in, for example, a range of or all spatial directions.

Vertical cross sections 330 and 430 may include information related to a gather of points, for a range of zenith angles, and for a specific or single azimuth value.

The cylindrical radius 332 (e.g., of the meridian gather), corresponding to the amplitude of an image function, may vary along the length of the vertical axis 310. For example, in vertical cross sections 330, the cylindrical radius 332 may decay or reduce as the depth or axis 310 coordinate increases. Thus, for a limited acquisition area or a limited distance between the source and the receiver, the maximum possible opening angle between the incident and the reflected rays typically decrease with increasing depth and, for example, a zenith angle approaching an infinite depth may vanish (e.g., or approach a negligent or zero value). For the directional subsystem, along vertical cross section 430, the maximum zenith angle may also decay with depth.

Cylindrical radius 332, axes 310 and 410, image function, etc. may be viewed on the cylindrical displays 300 and 400, respectively, or as separate data points or graphs. In another embodiment, this data may be hidden or revealed according to a selection by a user.

Although displays of three-dimensional bodies shaped as cylinders are described herein, it may be appreciated by the one skilled in the art that differently shaped three-dimensional bodies may be used to concurrently represents data associated with a plurality of image points. For example, a plurality of spherical surface displays, each representing data associated with a single point, may be assembled into shapes other than cylinders.

In one embodiment, each of the spherical surface displays may be resized, e.g., to a different graded size (monotonically increasing or decreasing in size). Each resized spherical surface may be nested according to its size to form a solid sphere. For example, the smallest spherical surface may be an interior surface of the solid sphere and a largest spherical surface may be an exterior of the solid sphere). The resizing of each spherical surface (e.g., enlarging or decreasing) may be considered a projection map onto a differently sized spherical surface (e.g., larger and smaller, respectively). In one embodiment, there may be a minimum size for the smallest spherical surface, e.g., for that surface to contain and display (with proper resolution as to be useful to a user) the data associated with a single seismic image point. In this embodiment, the spherical three-dimensional body or solid may be hollow, e.g., having no data at a radii less than the radius of the smallest spherical surface. In other embodiments, the smallest spherical surface may be a point and the spherical body or solid may not be hollow. In such embodiments, the smallest one or more spherical surface may be used as placeholders. Since the smallest spherical surface are typically too small to visualize data associated therewith with proper resolution, a separate display may provide this data (e.g., as a full size spherical surface in a "pop-up" window).

Other shapes for the (e.g., solid) three-dimensional body may include a hyperboloid, ellipsoid, and polyhedron, e.g., which may be assembled from a plurality of nested hyperbolic surfaces, elliptical surfaces, and polyhedron surfaces, respectively, (e.g., each of differently graded size).

A three-dimensional body may define a solid object in a three-dimensional coordinate space. A three-dimensional surface may define a two-dimensional manifold, e.g., in a three-dimensional coordinate space. Other definitions of surfaces and bodies may be used. Spherical displays 100 and 200 of FIGS. 1 and 2, respectively, are typically three-dimensional surfaces and cylindrical displays 300 and 400 of FIGS. 3 and 4, respectively, are typically three-dimensional body.

Example of Workflow

Reference is again made to FIGS. 5 and 6, which are flowcharts of methods, according to embodiments of the invention. For example, FIG. 5 describes operations for generating and displaying spherical displays (e.g., shown in FIGS. 1 and 2) and cylindrical displays (e.g., shown in FIGS. 3 and 4), according to one embodiment. Other embodiments may be used to create such displays.

The flowcharts describe an example of workflow for data processing and data visualization, for example, using spherical and cylindrical displays. It may be appreciated by the one skilled in the art that this workflow is only an example, among a variety of other possible sequences of operations, and this workflow example does not limit the invention.

Figure 5:
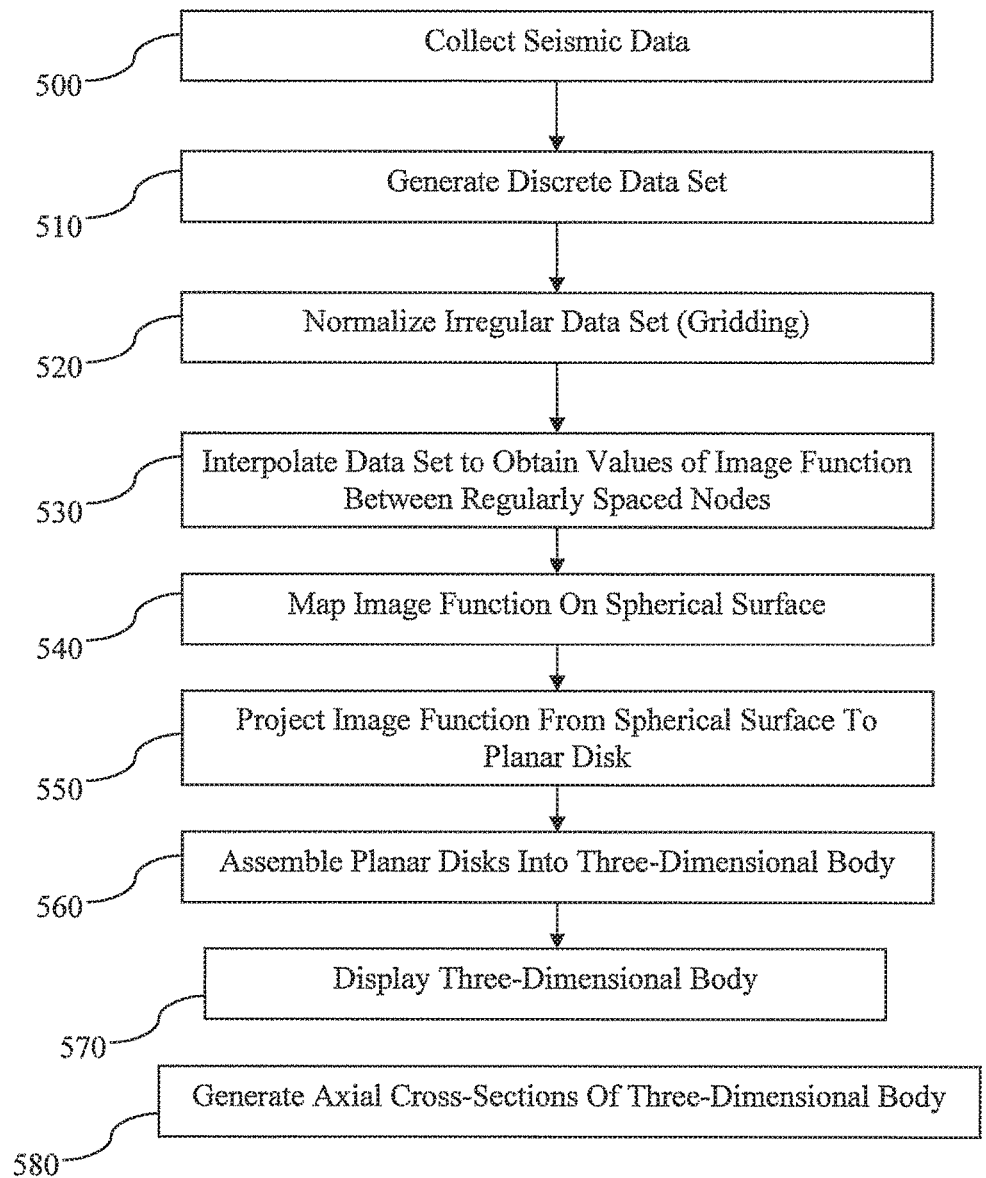
FIGS. 5 and 6 are flowcharts of methods, according to embodiments of the invention.

Referring to FIG. 5, in operation 500, a seismic acquisition system (e.g., system 700 of FIG. 7) may collect seismic data. Other data, such as medical imaging data or industrial imaging data, may be collected, processed, and displayed.

In operation 510, a processor (e.g., processor 140 of FIG. 7) may generate a discrete data set (e.g., discrete data set 815 or 825 of FIGS. 8A and 8B) representing an image function for an image point. The discrete data set may include seismic data gathers traced from the acquired seismic data. The seismic data gathers may be, for example, discrete azimuthally dependent angle and/or offset domain gathers for the directional and/or reflection subsystems. Other data or types of gathers may be used.

In operation 520, the processor may normalize (or grid) an irregular data set (e.g., irregular discrete data set 815 of FIG. 8A) (e.g., using the first map 860). For example, a computational mesh (e.g., computational mesh 822) may be generated along which data nodes (e.g., nodes 820) or control points of the discrete data set may be regularly or evenly spaced. This operation may be skipped if the nodes or control points of the discrete data set are already regularly or evenly spaced.

In operation 530, the processor may, for each gather node, and for each subsystem (e.g., the directional and reflection subsystems), apply an interpolation technique (e.g., using the second map 865), to obtain the values of the image function between the regularly spaced nodes of the mesh (e.g., on the continuous curved three-dimensional surface 835).

In operation 540, for selected gather nodes, and for each of the subsystems, the processor may plot the image function on a spherical or otherwise curved surface (e.g., spherical displays 100 and 200, of FIGS. 1 and 2, respectively). The displayed color map or other map may include a continuous distribution of the image function through the spherical or otherwise curved surface (e.g., continuous curved three-dimensional surface 835).

In operation 550, for each gather node, the processor may (e.g., using the third map 870), project, flatten, or expand the image date defined on the spherical surface or otherwise curved surface, onto a planar surface 845 (e.g., a circular or other disk) such as a circular or non-circular planar disk.

In operation 560, for each of the two subsystems, the processor may assemble planar disks having the projected image date (e.g., using the fourth map 875). The data defined with planar surfaces for each gather node may be combined to form a three-dimensional body (e.g., three-dimensional body 855) such as a circular or non-circular cylinder.

In operation 570, the processor may display the three-dimensional body (e.g., cylindrical displays 300 and 400, of FIGS. 3 and 4, respectively).

In operation 580, the processor may generate axial cross sections (e.g., 330 and 430 of FIGS. 3 and 4, respectively) of the three-dimensional body (e.g., of cylindrical displays 300 and 400, respectively) for arbitrary azimuths selected by a user. Each axial cross section may represent a single-azimuth image gather including multiple zenith angles (e.g., or offset magnitudes) within a given range, and multiple gather nodes in depth.

Other operations or series of operations may be used.

Figure 6:
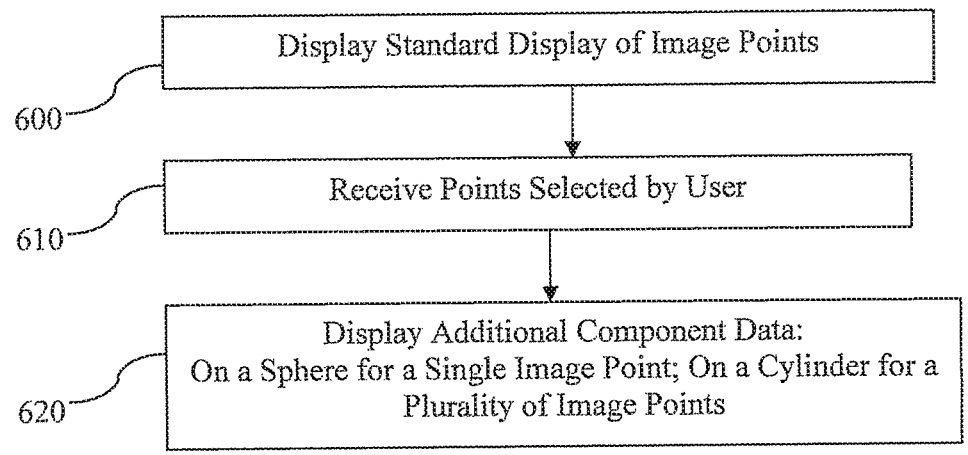

Referring to FIG. 6, in operation 600, a first display (e.g., display 180a of FIG. 7) may show a standard display of image points (e.g., seismic data) as a visualization of a geophysical region. The first display may be a visualization of an image function vs. location. For example, each point may be defined by three components, such as, Cartesian components of the point, and a color corresponding to a function value at each point. While specific displays (e.g. FIGS. 1-4) and data structures are described, other displays and data structures may be used with embodiments of the invention.

In operation 610, an input device may receive point selected or indicated by a user. The user may indicate (e.g., by clicking or highlighting) the physical location of one image point or a plurality of image points (e.g., determined to be located along a line in a physical space, e.g. a vertical line) of the standard display to be displayed as a sphere or cylinder. Points may be "determined" to be located instead of "actually" located, since geophysical simulations typically have less than full (100%) accuracy. In response to such an indication, a display may display (e.g., on the graphical user interface) a representation of the indicated data to a user.

In operation 620, in response to receiving indications of one or more seismic image points from a user, a second display (e.g., display 180b of FIG. 7) may display (e.g., on graphical user interface 182b), one or a plurality (e.g., a gather) of image points, of one or more components of data in addition to the data displayed in operation 600 (e.g., on graphical user interface 182a). The second display may be a visualization of the image function vs. additional component, such as, an orientation on the spherical display, or a location (e.g. vertical) and orientation on the cylindrical display. When data for one image point is displayed, the display may include spherical displays 100 and/or 200 of FIGS. 1 and 2. When data for a plurality of image point or seismic image gather (e.g., corresponding to a line or curve in a physical space) is displayed, the display may include cylindrical displays 300 and 400 of FIGS. 3 and 4. The additional component data displays (e.g., on graphical user interface 182b) may be displayed with or adjacent to a standard display or visualization of a geophysical region (e.g., on graphical user interface 182a). While two displays or monitors are shown, this is by way of example only, and only one or more than two monitors may be used, and further only one type of data need be displayed at one time. For example, a "standard" 3D display need not be displayed, but rather specific components.

In one embodiment, the cylindrical display (e.g., 300 and/or 400, of FIGS. 3 and 4) may be viewed as a partially hollowed structure. Alternatively, the display may be (e.g., initially) solid and when operated on or manipulated by a user, may become transparent to reveal data not shown on the outside surface of the solid structure. For example, only one planar disk may be displayed at a time. The other disks may be hidden so that they do not obstruct a view of the single displayed disk. In other embodiments, two or more disks may be simultaneously displayed. For example, a user may indicate a point (e.g., along the line 880) on the cylinder and in response to the indication, the display may display the disk having that point. Data corresponding to the hidden disks, e.g., the maximum cylindrical radius 332 (e.g., of the meridian gather), corresponding to the maximum zenith angle of the image function of a disk varying along the length of the vertical axis 310, may be displayed. The cylindrical radius 332 of the meridian gather may be a simple indication of the image function of disks that are not displayed. A user may for example compare the detailed image function of the single displayed disk to the simplified representation of the image function (e.g., a maximum cylindrical radius 332 representing maximum zenith angle of the meridian gather) of the hidden disks, e.g., to identify trends or compare image function or component values among disks.

Other portions of the displays may be hidden or revealed and the hidden or revealed structures may be changeable, e.g., controlled at least in part by a user operating an input device. For example, when displaying cylindrical display (e.g., 300 and/or 400, of FIGS. 3 and 4), a user may request (e.g., by right clicking or selecting an appropriate icon) to hide or to reveal axes 310 and/or 340, planar nodes 840 (e.g., e.g., overlaid on corresponding planar disks), and/or cylindrical nodes 850 (e.g., e.g., overlaid on the corresponding cylindrical displays). For example, when displaying spherical display (e.g., 100 and/or 200, of FIGS. 1 and 2), a user may request to hide or to reveal computational mesh 822, or an output mesh thereof, e.g., spiraling nodes 830, etc. The user may request additional information to reveal the physical space (e.g., by color, highlighting, arrow pointers, etc.) to which a selected one or more image points are determined to be located (e.g., on the first display of operation 600). Additional data may be shown, e.g., the number of iterations used to generate a computational mesh 822 or a visualization of the stages of the recursive construction (e.g., from an first stage polygon having a relatively few number of faces to a last stage polygon having a relatively large number of faces and closely approximating a sphere to within a predetermined threshold of error compared to the next iteration). Other data, such as, maximum cylindrical radius 332 of a line of points such as the meridian gather, color maps, axes 310 and 410, locations of image points on the cylindrical display and/or in a physical space, image function values, color maps, etc. may be viewed on the display or as separate data points or graphs. This data may be hidden or revealed according to a selection by a user.

In one embodiment, a cylindrical display (e.g., 300 and/or 400, of FIGS. 3 and 4) may display components of image data corresponding to two subsystems (e.g., reflection angle or offset and direction). The cylindrical display may include multiple stacked planar disks, each flattened from a spherical display (e.g., 100 and/or 200, of FIGS. 1 and 2), each spherical display representing an image function for a different point of an image gather. The cylindrical display may thus correspond to an image gather. Displays other than a cylindrical display may be used, such as cones, pyramids, funnels, conical or cylindrical portions or sections, etc.

The user may, for example, analyze the pair of reflection (e.g., or offset) and directional displays corresponding to the same point. A pair of displays including a directional display having a single or narrow range of values and a reflection angle (e.g., or offset) display having multiple or a wide range of values the image point may indicate that the image point lies on a fault line.

Thus, operations 610 to 620 may be repeated, for example, as a user indicate other image points (e.g., scanning image points), to view corresponding pairs of directional and reflection angle (e.g., or offset) displays to discover the locations of image points that fall on fault lines.

Other benefits may be realized.

Other operations or series of operations may be used.

Example of a System

Reference is made to FIG. 7, which is a schematic illustration of a system, including a transmitter, a receiver and a computing system in accordance with an embodiment of the present invention. System 700 may be used, for example, to display image data, such as, for example, seismic data, in a spherical displays (e.g., of FIGS. 1 and 2) and/or cylindrical displays (e.g., of FIGS. 3 and 4) and/or displays of a standard or physical space. Data other than seismic data may be used with embodiments of the present invention. System 700 may perform embodiments of any of the methods discussed herein, and/or other operations or computations. System 700 may, for example, display a standard display or visualization of physical space (e.g., a geophysical space, a medical image), and in addition or as an alternate option for a user, displays such as but not limited to spherical or cylindrical displays, which may display details or additional component data which may have been used to build the standard visualization. System 700 may include for example a transmitter 110, a receiver 120, a computing system 130, and one or more displays 180a and 180b. In a system having more than one monitor or display, a standard display or visualization of a physical space may be displayed on one display (e.g., display 180a), and spherical or cylindrical displays displaying details or additional component data may appear on a second display (e.g., display 180b). However, one display may be used for displaying one or more types of information (e.g., a standard display and/or a display including additional component data). Transmitter 110 may output any suitable signals, or generate incident signal(s). For example, a series of sonic or seismic energy rays or waves may be emitted from each of multiple locations. Receiver 120 may accept reflected signal(s) that correspond or relate to incident signals, sent by transmitter 110. In the case of imaging in other areas, e.g., medical imaging, transmitter 110 may output energy such as ultrasound, magnetic, x-ray, or other suitable energy.

Computing system 130 may include, for example, processor 140, memory 150 and software 160. Processor 140 may process data, for example, raw data received from receiver 120. Memory 150 may store data, for example, raw or processed seismic data. Operations executed according to embodiments of the invention, such as for example, mapping, projecting, interpolating, gridding, generating a computational mesh, estimating, approximating, displaying, etc. may be at least partially executed, operated or calculated, for example, by an operator (e.g., implemented in software 160). Other units or processors may perform such operations, or other operations according to embodiments of the present invention.

Displays 180a and/or 180b (e.g., such as monitors or screens) may display to a user or viewer spherical or cylindrical displays representing data from transmitter 110, receiver 120, computing system 130, or any other suitable systems, devices, or programs, for example, an imaging program or software, or a transmitter or receiver tracking device. Displays 180a and/or 180b may include one or more inputs for displaying data from multiple data sources. The system may include multiple displays. Displays 180a and/or 180b may display images produced from data. For example, displays 180a and/or 180b may display representations or visualizations of seismic or other imaging data, for example, angle dependent CIGs, processes according to embodiments described herein.

Displays 180a and 180b may include for example one or more graphical user interfaces 182a and 182b, respectively. The displays may, in response to an indication, from a user operating the input device 170, of one or more seismic image points or a line of a physical space, display the graphical user interfaces 182a and/or 182b. The display may, for example, display direction data, data for a plurality of directions, and/or an image function vs. the direction, associated with the indicated seismic image point. The graphical user interfaces 182a and/or 182b may enable a user to view the results of their input (e.g., operating the input device 170) or interact with the displays for selecting points, requesting additional data, setting graphical parameters, selecting to hide or reveal graphical structures, etc.

Computing system 130 may include, for example, one or more input device(s) 170 (e.g., such as a keyboard and/or mouse) for receiving command, selections, or signals (e.g., from a user or other external device).

Computing system 130 may include, for example, any suitable processing system, computing system, computing device, processing device, computer, processor, and the like, and may be implemented using any suitable combination of hardware and/or software.

Processor 140 may include, for example, one or more processors, controllers or central processing units ("CPUs"). Software 160 may be stored, for example, all or in part, in memory 150. Software 160 may include any suitable software, for example, for processing or imaging according to embodiments of the present invention. Processor 140 may operate at least partially based on instructions in software 160. Embodiments of the invention may include a computer readable storage medium, such as for example a memory, a disk drive, or a "disk-on-key", including instructions which when executed by a processor or controller, carry out methods disclosed herein, or cause the processor to carry out such methods. Software 160 may be stored on the computer readable storage medium.

System 700 may, for example, display images of target surfaces, for example, using software 160 and/or processor 140, or other components such as dedicated image or signal processors. Such displays may be used and analyzed for example, for determining the locations of image points that lie on faults or other geological discontinuities or points of interest.

System 700 may, for example, display a seismic image data point. The spatial features of the seismic data point (e.g., a zenith and azimuth angles, a relative location, and/or other spatial coordinates within a larger subsurface region) may be represented in a standard display of a conventional (e.g., Cartesian or polar) coordinate system.

Processor 140 may, for example, compute, from a wide-azimuth data set, a discrete data set (e.g., 815 or 825 of FIGS. 8A and 8B, respectively) associated with an image function at a seismic image point in a three-dimensional coordinate system. The processor 140 may map (e.g., by interpolation or gridding) the discrete data set onto a continuous curved three-dimensional surface (e.g., 835 of FIG. 8C).

Processor 140 may generate a computational mesh (e.g., according to operation 520 of FIG. 5). The computational mesh (e.g., computational mesh 822 of FIG. 8B) may include regularly spaced nodes (e.g., nodes 820). Processor 140 may grid (e.g., or interpolate) the input data onto the computational mesh (e.g., according to operation 530 of FIG. 5). For example, processor 140 may map the discrete data set onto the continuous curved three-dimensional surface, for example, by estimating the values of the image function at the nodes of the computational mesh and at points between the regularly space nodes of the computational mesh. Processor 140 may generate the computational mesh starting from a primary polyhedron inscribed into a sphere and then splitting its spherical triangles in a recursive manner, as described in the previous sections.

Other relationships or maps between the spatial coordinates and the continuous curved three-dimensional surface may be used.

Displays 180a and/or 180b may display the continuous curved three-dimensional surface as a sphere, an ellipsoid, a spherical cap, and an ellipsoidal cap, or otherwise curved 3D surface (e.g., such as spherical displays 100 and/or 200 of FIGS. 1 and 2, respectively).

Processor 140 may, for example, project the mapped data set onto a continuous curved two-dimensional surface (e.g., a planar disk). Displays 180a and/or 180b may display the projected data as a planar disk. The outer boundary of the planar disk may be, for example, a closed curve, including a circle, an ellipse, or another closed curve, or an otherwise 2D surface (e.g., such as displays of planar surface 845 of FIG. 8D). The radii of the points on the planar disk may, for example, correspond to zenith angles of the discrete data set or to offset magnitudes of the discrete data set.

Processor 140 may, for example, assemble the plurality of continuous planar surfaces into a three-dimensional body (e.g., 855 of FIG. 8E). Displays 180a and/or 180b may display the three-dimensional body as a cylinder, a cone, a truncated cone, or otherwise curved 3D body (e.g., such as cylindrical displays 300 and/or 400 of FIGS. 3 and 4, respectively).

The arguments of the image function represented on the continuous curved three-dimensional surface may include, for example, direction angles, reflection angles, offsets (e.g., defined by offset magnitudes and azimuths) of, e.g., wide-azimuth data collected during geophysical exploration, and/or other or additional components not typically shown on a standard display. Although these additional components may be combined or processed to provide spatial features of the image point, each of the additional components typically do not show a location of the image point in a geophysical space.

System 700 may, for example, display a seismic image gather. Processor 140 may generate, from a wide-azimuth data set, a plurality of discrete data sets (e.g., 815 or 825 of FIGS. 8A and 8B, respectively). Each discrete data set may be associated with an image function of one of a plurality of seismic image data points determined to be located along a line in a physical space. Each of the plurality of seismic image data points determined to be located along a line in a physical space may correspond to a seismic image gather representing a plurality of zenith angles and a single azimuth angle.

Processor 140 may grid each of the discrete data sets onto a continuous curved three-dimensional surface. Processor 140 may project each of the gridded data sets onto a continuous curved two-dimensional surface. Processor 140 may assemble the plurality of continuous curved two-dimensional surface into a three-dimensional body. Processor 140 may assemble the plurality of continuous curved two-dimensional surfaces into a three-dimensional body along an axis (e.g., line 880 of FIG. 8E) of symmetry of the body.

Displays 180a and/or 180b may display the three-dimensional body. The three-dimensional body for concurrently representing data associated with the line of points. The three-dimensional body may be, e.g., such a cylinder (e.g., such as cylindrical displays 300 and/or 400 of FIGS. 3 and 4, respectively), a cone, a funnel, or a pyramid.

An input device (e.g., input device 170 of FIG. 7) may receive indications from a user of a seismic image point or a line (e.g., of seismic image points) in a physical space. The display may, in response to the indication of the seismic image point from a user operating the input device, display a graphical user interface (e.g., graphical user interface 182b of FIG. 7) comprising projected data derived from the discrete data set associated with the indicated seismic image point. The display may, in response to an indication of the line from a user operating the input device, display a graphical user interface (e.g., graphical user interface 182b) including the three-dimensional body derived from the discrete data set associated with the plurality of seismic image data points determined to be located along the indicated line.

One embodiment of the invention may include displaying wide-azimuth seismic image data mapped from a first coordinate system to a reduced dimensional coordinate system for reducing the dimensionality of the data set. The reduced dimensional coordinate system may be for example, as described in U.S. patent application Ser. No. 11/798,996. A display may include a spiraling geometry. According to one embodiment, the reduced dimensional data may be displayed on spherical surfaces for the reflection angle (FIG. 1) and directional (FIG. 2) subsystems of the LAD. These displays may be projected and assembled to form reduced dimensional cylindrical displays in the reduced dimensional coordinate space.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method for displaying a partially hollowed structure representing one or more seismic image data points, the method comprising:
   computing, from a wide-azimuth data set, a data set including multiple azimuths associated with an image function for each of a plurality of seismic image data points;
   mapping the data sets for the plurality of seismic image data points onto a plurality of respective continuous planar surfaces;
   assembling the plurality of continuous planar surfaces into a three-dimensional body; and
   displaying one or more of the plurality of continuous planar surfaces as solid planar surfaces and one or more of the plurality of continuous planar surfaces as transparent planar surfaces.

2. The method of claim 1 comprising initially displaying the three-dimensional body as a solid body and subsequently displaying the three-dimensional body as the partially hollowed structure when operated by a user.

3. The method of claim 1, wherein the transparent planar surfaces are hidden so as not to obstruct a view of the solid planar surfaces.

4. The method of claim 1 comprising displaying data associated with the transparent planar surfaces.

5. The method of claim 4 comprising displaying a maximum cylindrical radius corresponding to a maximum zenith angle of the image function of one or more of the transparent planar surfaces.

6. The method of claim 1 comprising, in response to user input selecting a seismic image data point, displaying the corresponding one of the plurality of continuous planar surfaces as a solid planar surface.

7. The method of claim 1 comprising, in response to user input, changing the one or more of the plurality of continuous planar surfaces that are displayed as solid and transparent planar surfaces.

8. The method of claim 1 comprising, in response to user input, hiding or revealing one or more data structures selected from the group consisting of: one or more axes, one or more nodes, and a computational mesh.

9. The method of claim 1 comprising displaying a standard model of a geophysical region containing one or more seismic image data points corresponding to the solid planar surfaces.

10. The method of claim 1, wherein an outer boundary of each of the plurality of continuous planar surfaces is selected from the group consisting of: a closed curve, a circle, and an ellipse.

11. The method of claim 1, wherein the three-dimensional body is selected from the group consisting of: a cylinder, a cone, a funnel, and a pyramid.

12. A system for displaying a partially hollowed structure representing one or more seismic image data points, the system comprising:
   one or more processors configured to compute, from a wide-azimuth data set, a discrete data set including multiple azimuths associated with an image function for each of a plurality of seismic image data points, to map the data sets for the plurality of seismic image data points onto a plurality of respective continuous planar surfaces, to assemble the plurality of continuous planar surfaces into a three-dimensional body, and to display one or more of the plurality of continuous planar surfaces as solid planar surfaces and one or more of the plurality of continuous planar surfaces as transparent planar surfaces.

13. The system of claim 12, wherein the one or more processors are configured to initially display the three-dimensional body as a solid body and subsequently display the three-dimensional body as the partially hollowed structure when operated by a user.

14. The system of claim 12, wherein the one or more processors are configured to display data associated with the transparent planar surfaces.

15. The system of claim 14, wherein the one or more processors are configured to display a maximum cylindrical radius corresponding to a maximum zenith angle of an image function of one or more of the transparent planar surfaces.

16. The system of claim 12 comprising an input device for receiving input from a user, wherein, in response to a selection of a seismic image data point from a user operating the input device, the one or more processors are configured to display one of the plurality of continuous planar surfaces corresponding to the selected seismic image data point as a solid planar surface.

17. The system of claim 12 comprising an input device for receiving input from a user, wherein, in response to receiving input from a user operating the input device, the one or more processors are configured to change the one or more of the plurality of continuous planar surfaces that are displayed as solid and transparent planar surfaces.

18. The system of claim 12 comprising an input device for receiving input from a user, wherein, in response to receiving input from a user operating the input device, the one or more processors are configured to hide or reveal one or more data structures selected from the group consisting of: one or more axes, one or more nodes, and a computational mesh.

19. The system of claim 12, wherein the one or more processors are configured to display a standard model of a geophysical region containing one or more seismic image data points corresponding to the solid planar surfaces.

20. The system of claim 12 comprising a display to visualize the solid planar surfaces and transparent planar surfaces.

* * * * *